United States Patent
Ichiyama

(10) Patent No.: US 8,207,645 B2
(45) Date of Patent: Jun. 26, 2012

(54) MAGNETIC FLUX CONTROLLABLE ROTATING ELECTRIC MACHINE SYSTEM

(75) Inventor: Yoshikazu Ichiyama, Kyoto (JP)

(73) Assignee: Kura Laboratory Corporation, Kyoto (JP)

( * ) Notice: Subject to any disclaimer, the term of this patent is extended or adjusted under 35 U.S.C. 154(b) by 431 days.

(21) Appl. No.: 12/646,971

(22) Filed: Dec. 24, 2009

(65) Prior Publication Data

US 2010/0213885 A1 Aug. 26, 2010

(30) Foreign Application Priority Data

Feb. 24, 2009 (JP) .................................. 2009-40869
Apr. 28, 2009 (JP) ................................ 2009-109082
Aug. 27, 2009 (JP) ................................ 2009-196673

(51) Int. Cl.
*H02K 1/00* (2006.01)
*H02K 3/00* (2006.01)
*H02K 21/00* (2006.01)
*H02K 19/26* (2006.01)
*H02K 23/46* (2006.01)

(52) U.S. Cl. ........ 310/191; 310/209; 310/180; 310/181; 310/190; 310/156.55; 310/156.56

(58) Field of Classification Search ............. 310/156.55, 310/156.56, 180, 181, 190, 191, 209; *H02K 1/00, H02K 3/00, 21/00, 23/46, 19/26*
See application file for complete search history.

(56) References Cited

U.S. PATENT DOCUMENTS

| 5,397,975 | A | * | 3/1995 | Syverson | ........................ 322/46 |
| 5,682,073 | A | | 10/1997 | Mizuno | |
| 5,689,166 | A | | 11/1997 | Nagayama et al. | |
| 5,767,601 | A | | 6/1998 | Uchiyama | |
| 6,236,134 | B1 | * | 5/2001 | Syverson | ...................... 310/181 |
| 6,541,887 | B2 | * | 4/2003 | Kawamura | ..................... 310/190 |
| 6,700,279 | B1 | | 3/2004 | Uchiyama et al. | |
| 6,800,977 | B1 | | 10/2004 | Ostovic | |
| 6,900,570 | B2 | * | 5/2005 | Ifrim | ............................. 310/190 |
| 6,977,453 | B2 | | 12/2005 | Yoda et al. | |
| 7,567,006 | B2 | | 7/2009 | Ichiyama | |
| 2002/0047433 | A1 | * | 4/2002 | Sekiyama et al. | ........ 310/156.55 |
| 2002/0047448 | A1 | * | 4/2002 | Kawamura | ..................... 310/181 |
| 2005/0258699 | A1 | * | 11/2005 | Hsu | .......................... 310/156.56 |
| 2007/0145850 | A1 | * | 6/2007 | Hsu | .......................... 310/156.56 |

FOREIGN PATENT DOCUMENTS

JP 2008-289300 11/2008

* cited by examiner

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

In a magnet-exciting rotating electric machine system, a rotor surface has magnetic salient poles and island-shaped magnetic poles alternately in circumferential direction, and the island-shaped magnetic poles are constituted so that magnetic flux coming from an external source does not flow through. A magnetic excitation part magnetizes the island-shaped magnetic poles and the magnetic salient poles collectively in the same direction, and then control a flux amount flowing through an armature. The armature has armature coils that face the magnetic salient pole and the island-shaped magnetic pole simultaneously so that driving torque fluctuation or power generation voltage waveform distortion is controlled. The magnetic excitation part changes magnetization state of a field magnet irreversibly, or changes an excitation current to an excitation coil to control a flux crossing the armature.

20 Claims, 19 Drawing Sheets

MAGNETIC FLUX CONTROLLABLE ROTATING ELECTRIC MACHINE SYSTEM

CROSS-REFERENCE TO RELATED APPLICATIONS

The present application claims priority under 35 U.S.C. §119 to Japanese Patent Applications No. 2009-40869 filed Feb. 24, 2009, No. 2009-109082 filed Apr. 28, 2009, and No. 2009-196673 filed Aug. 27, 2009. The contents of these applications are incorporated herein by reference in their entirety.

BACKGROUND OF THE INVENTION

1. Field of the Invention

The present invention relates to rotating electric machines such as electric generators and electric motors having a permanent magnet.

2. Discussion of the Background

Rotating electric machine apparatus, such as an electric generator for electromagnetically generating electric power by relative rotation of a permanent magnet and an armature, or an electric motor for generating relative rotation between a permanent magnet and an armature by interaction of the permanent magnet and a magnetic field generated by electric current supplied to the armature, are excellent in energy efficiency and have been widely used routinely with development of permanent magnets. However, in both electric motors and electric generators, optimum power is not always obtained in a wide rotational speed range because the amount of magnetic flux supplied from field magnet is constant.

In the case of the electric motor, it will become difficult to control the electric motor in a high-speed rotational region because the back electromotive force (power generation voltage) becomes too high, and therefore, various methods for weakening the field strength as field-weakening control have been proposed. On the other hand, in the case of the electric generator, a constant-voltage electric generator by means of field current control only or a constant-voltage circuit in which the power generation voltage is made to be constant by a semiconductor has been exclusively used so that the power generation voltage is made to be at a predetermined level in a wide rotational-speed range.

In the case of electric motor, field-weakening control by means of phase leading electric current control has been widely adopted, but the energy efficiency and the control range are limited. Attempts have been made to perform the field control in the rotating electric machines by means of a mechanical deviation (For example, U.S. Pat. No. 7,567,006) without sacrificing the high energy efficiency upon the rotating electric machines with a permanent magnet. As the field magnet condition can be maintained in the form of mechanical deviation, a rotating electrical machine can be actualized with high energy efficiency with the energy loss due to field excitation being kept minimum.

The other method for controlling strength of magnetic field to keep the energy loss at minimum is to change a magnetization state of a field magnet irreversibly, and a technical proposition is made in Japanese Patent Laid-Open No. 2008-289300. This proposed technology has a configuration in which a configuration for a current excitation as shown in U.S. Pat. No. 5,682,073 is substituted by a magnet excitation configuration in which magnetization can be changed. However, this has drawbacks such as that the field magnet is susceptible to the magnetic field of an armature coils, configuration thereof is complicated because an excitation coil and the armature coil interfere with each other, and application is limited to short shaft electric rotational machines because magnetic flux from the field magnet concentrate in the central area.

In the example of the hybrid excitation that has both magnet excitation and current excitation, there is a technological proposal of U.S. Pat. No. 5,767,601. This is a simplified example with current excitation, and have only one of two rotors that U.S. Pat. No. 5,682,073 includes. Therefore a torque change, waveform distortion of the generation voltage are not negligible, and a range of the amount of flux control is limited. In addition, in any configuration above, half of the rotor surface is covered by permanent magnets, so the reluctance torque is difficult to be exploited.

SUMMARY OF THE INVENTION

A rotating electric machine system according to the present invention has a configuration that a rotor and an armature are disposed radially. The rotor has island-shaped magnetic poles and magnetic salient poles alternately arranged in circumferential direction, the island-shaped magnetic poles are composed so that a magnetic flux coming from a magnetic excitation part should not flow there-through, the magnetic salient poles are composed so that the magnetic flux can flow there-through. The island-shaped magnetic poles and the magnetic salient poles are magnetized collectively in the same direction by the magnetic excitation part, and then the amount of fluxes flowing through the armature is controlled. The specific configuration of the rotating electric machine system will be described herein below.

A rotating electric machine has a rotor and an armature which oppose each other in the radial direction to rotate relatively to each other. The armature has armature coils arranged in circumferential direction on its plane facing the rotor. The rotor has island-shaped magnetic poles and magnetic salient poles arranged alternatively in a circumferential direction on its plane facing the armature. A magnetic excitation part is provided to magnetize all the magnetic salient poles and the island-shaped magnetic poles collectively in same direction. The rotor has isolation members formed by permanent magnet and/or non-magnetic material at least within the island-shaped magnetic pole to prevent passage of magnetic flux coming from outside. Thickness of the isolation member within the island-shaped magnetic pole should be larger than thickness of the isolation member within the magnetic salient pole so that magnetic flux coming from the magnetic excitation part should not flow to the armature via the island-shaped magnetic pole. The island-shaped magnetic poles are configured such that it may be magnetized in same direction and almost radially by at least one of a permanent magnet adjacent to the island-shaped magnetic pole and a permanent magnet within the island-shaped magnetic pole. The magnetic excitation part has at least one of an excitation coil and a field magnet, both ends of the magnetic excitation part are magnetically coupled respectively with one of the rotor and the armature arranged at an innermost position, and one of the rotor and the armature arranged at an outermost position so that a magnetic flux coming from one end of the magnetic excitation part may return to the other end thereof through the armature and the magnetic salient poles. And thereby, an amount of the magnetic flux flowing through the armature is controlled by changing the amount of magnetic flux supplied from the magnetic excitation part in accordance with an output of the rotating electric machine system so that the output is optimized.

As for the rotor arranged at an outermost or an innermost position, the island-shaped magnetic poles and the magnetic salient poles are arranged on a cylindrical magnetic substrate, and, one end of the magnetic excitation part is magnetically coupled with the cylindrical magnetic substrate. As for the armature arranged at an outermost or an innermost position, the armature coils are arranged on a magnetic yoke, and, one end of the magnetic excitation part is magnetically coupled with the magnetic yoke. The armature and the magnetic salient poles are configured to form a flux path for a magnetic flux coming from the magnetic excitation part flowing therethrough. That is, in the configuration that the rotor, the armature, and the rotor are arranged to make a line in the order as recited here, when the armature is composed of armature coils arranged in circumferential direction, the magnetic salient poles of two rotors are radially opposed each other with the armature interposing therebetween. When the armature coil is wound around magnetic teeth which extend radially, the magnetic salient poles and the magnetic teeth are configured so that magnetic fluxes coming from the magnetic excitation part flow through the magnetic salient poles of two rotors and the magnetic teeth intermittently in accordance with rotational position of the rotor. Further, in the configuration that an armature, a rotor, and an armature arranged in a line in the recited order, when the armature coils are wound around magnetic teeth which extend radially, the magnetic salient poles and the magnetic teeth are configured so that a magnetic flux coming from the magnetic excitation part flows through the magnetic salient poles and the magnetic teeth of two armatures intermittently in accordance with rotational position of the rotor.

The above-mentioned rotating electric machine system has the armature and the rotor opposed radially, and one of typical compositions is a composition where a single rotor and a single armature face through a single gap. That is, the armature has the armature coils arranged in circumferential direction at a magnetic yoke facing the rotor, the rotor has the island-shaped magnetic poles and the magnetic salient poles alternately in circumferential direction on the cylindrical magnetic substrate facing the armature, and both ends of the magnetic excitation part are magnetically coupled respectively with the magnetic yoke and the cylindrical magnetic substrate, respectively.

Further, another one of typical configurations is that the armature, the rotor and the armature queue up radially in the order as recited here. That is, the rotor has the island-shaped magnetic poles and the magnetic salient poles disposed alternately in circumferential direction facing the armature, each armature has the armature coils arranged on a magnetic yoke in circumferential direction facing the rotor, and both ends of the magnetic excitation part are magnetically coupled respectively with the magnetic yoke of two armatures respectively.

In the above-mentioned rotating electric machine system, one of actual configurations of the island-shaped magnetic poles and the magnetic salient poles as magnetic pole portion of the rotor is as follows; a uniform magnetic material is separated by permanent magnets and/or magnetic gaps, to form the island-shaped magnetic poles and the magnetic salient poles, and the island-shaped magnetic poles are configured such that it is difficult for the magnetic flux coming from the magnetic excitation part to flow as compared with the magnetic salient poles. Furthermore, other specific configuration is as follows; The entire island-shaped magnetic pole is composed of a permanent magnet, and the magnetic salient pole is made as a part of magnetic material. Permeability of permanent magnets is close to that of an air gap, the amount of the magnetic flux coming from the permanent magnet is substantially constant, so the permanent magnet with enough thickness can be applied as the isolation member for bi-directional magnetic flux. In addition to the magnetic torque, reluctance torque can be used when the island-shaped magnetic poles are composed of magnetically isolated magnetic material.

In the above-mentioned rotating electric machine system, as the amount of flux flowing from the island-shaped magnetic poles to the armature is made fixed, and the amount of flux flowing from the magnetic salient poles to the armature is made variable, then the amount of the magnetic flux flowing into the armature from the island-shaped magnetic poles and the amount of flux from the magnetic salient poles are imbalance in most cases causing fluctuation of torque or distortion of waveform of electric power generation. According to the present invention, the armature is configured such that fluctuation of the driving torque and the waveform of generated electric power are restrained even in a condition that imbalance exists in the amount of flux flowing to the armature via adjoining magnetic poles.

Therefore, in the above-mentioned rotating electric machine system, the armatures are grouped to a first armature magnetic pole group and a second armature magnetic pole group. In an armature coil pair of the same phase in the first armature magnetic pole group and the second armature magnetic pole group which armature coils are supplied with driving current simultaneously, the armature coils of the armature coil pair are arranged such that the armature coil of one of the armature coil pair opposes the island-shaped magnetic pole when the armature coil of other one of the armature coil pair opposes the magnetic salient pole, and the armature coils of the armature coil pair are connected to generate magnetic fluxes of mutually opposite directions when current flows. The armature coils can bear a configuration that the coils are wound around magnetic teeth or empty cores.

One of the specific configurations of the armature is as follows; an armature having the first armature magnetic pole group and an armature having the second armature magnetic pole group face the rotor respectively. In an armature coil pair of the same phase in the first armature and the second armature, the armature coils of the armature coil pair are arranged such that the armature coil of one of the armature coil pair opposes the island-shaped magnetic pole when the armature coil of other one of the armature coil pair opposes the magnetic salient pole, and they are connected in series to generate magnetic flux of opposite directions when current flows.

Further, still another of the specific configurations of the armature is such that an armature has the first armature magnetic pole group and the second armature magnetic pole group at different circumferential positions facing the rotor. In an armature coil pair of the same phase in the first armature magnetic pole group and the second armature magnetic pole group, the armature coils of the armature coil pair are arranged such that the armature coil of one of the armature coil pair opposes the island-shaped magnetic pole when the armature coil of other one of the armature coil pair opposes the magnetic salient pole, and they are connected in series to generate magnetic flux of mutually opposite direction when current flows.

Yet another one of specific configurations of the magnetic excitation part includes a field magnet of which magnetization is changeable. The magnetic excitation part has the field magnet and an excitation coil to change magnetization state of the field magnet, the magnetic excitation part is configured so that a magnetic flux flowing from one of N pole and S pole of the field magnet returns to the other pole thereof through one of the rotor and the armature arranged at an innermost position, one of the rotor and the armature arranged in midway, and one of the rotor and the armature arranged at an outermost position. And, excitation current is supplied to the excitation coil, magnetization of the field magnet is changed irreversibly, and a magnetic flux amount flowing through the armature is controlled according to an output of the rotating electric machine system so that the output thereof is optimized.

The field magnet is composed of parallel connection of magnet elements which are different in easiness of magnetization, or includes a permanent magnet whose easiness of magnetization (that is the product of length and coercivity) changes continuously within section thereof. Since magnetomotive force (difference in magnetic potential) is added by the excitation coil to the magnet elements substantially uniformly, the difference in magnetic potential divided by the length becomes strength of magnetic field to be applied to each magnet element, the magnet element with small product of the length and the coercivity is magnetized easily. Therefore, magnetization state of the magnet element which are different in easiness of magnetization is controlled selectively in accordance with the electric current fed to the excitation coil.

The magnet element has magnetization of one of the first magnetization and the second magnetization which are opposite in direction to each other. The magnet element that magnetizes the magnetic salient poles in the direction opposite to the magnetization direction of the island-shaped magnetic poles is assumed to be the first magnetization, and the amount of magnetic flux crossing the armature coil increases. Therefor, when magnetic pole area of the first magnetization is increased, magnetic flux crossing the armature coil will be increased.

Magnetic member to connect magnet elements in parallel is desirable to have magnetic saturation flux density almost equal to that of the magnet elements. Otherwise, magnetic flux coming from bigger thickness magnet element may concentrate on smaller thickness magnet element, and smaller thickness magnet element may be demagnetized. When magnetic flux is concentrated beyond saturation flux density, magnetic resistance becomes big, and magnetic flux concentration will be avoided.

As the magnetic flux induced by the armature coils returns through the armature and neighborhood of the rotor surface, but will not flow through the field magnet, the field magnet is arranged away from the armature coils. Therefor the field magnet is hard to be affected by the armature coils, a low coercivity magnet, or a magnet having small thickness can be applied for the field magnet, and magnetization state of the field magnet is easily controlled. In case that the armature coils are wound around magnetic teeth, distribution of the magnetic flux induced by the armature coils is further localized, and impact on the field magnet is made small.

Further, in the rotating electric machine as mentioned before, one of the specific configurations of the magnetic excitation part employs electric current excitation. The magnetic excitation part has the excitation coil and an excitation flux path member, and both ends of the excitation flux path member are coupled with one of the rotor and the armature arranged at an outermost position, and one of the rotor and the armature arranged at an innermost position, and the excitation coil is arranged so as to induce magnetic flux in a flux path including the excitation flux path member, the magnetic salient poles, and the armature. And, excitation current is supplied to the excitation coil, and the amount of magnetic flux flowing through the armature is controlled in accordance with an output of the rotating electric machine system so that the output thereof is optimized.

Further, one of the specific configurations of the magnetic excitation part is a configuration that a magnetic flux due to the field magnet and a magnetic flux due to the electric current excitation are superimposed. The magnetic excitation part has the excitation coil and the field magnet of which magnetization is changeable, a flux adjusting current of a degree that does not make the field magnet cause irreversible magnetization change is supplied to the excitation coil in each magnetization state of the field magnet, and the induced flux is superimposed on a flux coming from the field magnet. Therefore, the amount of the magnetic flux flowing through the armature is adjusted.

Even if it is possible to change magnetization of the field magnet continuously, in most cases, magnetization change of the field magnet is carried out intermittently. The amount of flux flowing through the armature is controlled discretely in many cases as a result. In the present invention, a flux induced by the excitation coil is superimposed on a flux coming from the field magnet in each magnetization state of the field magnet, and the amount of a magnetic flux flowing through the armature is precisely controlled.

In the rotating electrical machines that queues up a rotor and an armature radially, there are various kind of compositions as follows, a composition that single rotor and single armature are located radially in a line, a composition that a plurality of rotor and a plurality of armature are located alternately radially in a line, a composition that a rotor with a conical surface and an armature with a conical surface face each other etc., and the rotating electric machine system of this invention can be applied to any above-mentioned composition. In the rotating electric machine apparatus, the rotating electric machine is an electric motor when a current to the armature coils is input and a rotational force is output, and the rotating electric machine is an electric generator when the rotational force is input and current is output from the armature coils. Optimal magnetic structures exist in the electric motor or the electric generator, but are reversible, and the rotating electric machine system of this invention can be applied to both of the electric motor and the electric generator.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 4A shows the magnetization state of both field magnet region 41 and field magnet region 42. FIG. 4B shows the magnetization state that magnetic pole area of the field magnet region 41 is reduced. FIG. 4C shows the magnetization state that magnetic pole area of the field magnet region 41 is increased;

FIG. 9A shows the state that both of the first magnet element 65 and the second magnet element 66 are the first magnetization. FIG. 9B shows the state that the first magnet element 65 is the first magnetization and the second magnet element 66 is the second magnetization. FIG. 9C shows the state that both of the first magnet element 65 and the second magnet element 66 are the second magnetization;

DESCRIPTION OF THE EMBODIMENTS

Figure 1:
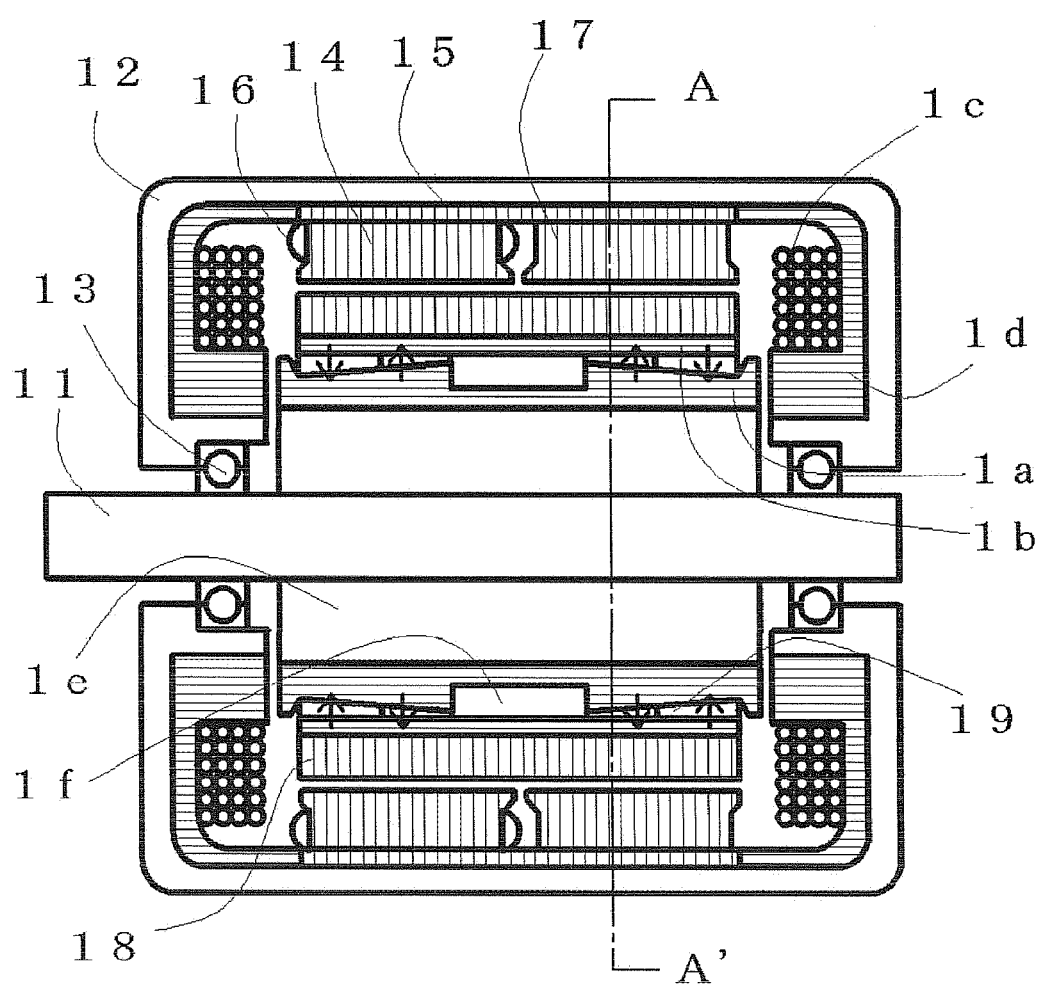
FIG. 1 is a longitudinal sectional view of a rotating electric machine apparatus according to the first embodiment of the present invention.

Embodiments of the present invention will be described hereinafter with reference to the accompanying drawings. In the following description, the constituent elements having substantially the same function and arrangement are denoted by the same reference numerals, and repetitive descriptions will be made only when necessary.

The rotating electric machine system according to a first embodiment of the present invention will be explained by using FIGS. 1 to 5. The first embodiment is a rotating electric machine system having two armatures to face a rotor, and being able to change magnetization of a field magnet continuously.

FIG. 1 shows a longitudinal sectional view of the embodiment in which the present invention is applied to a rotating electric machine apparatus having a radial gap structure, and a rotational shaft 11 is supported rotatably by a housing 12 through bearings 13. A rotor has a surface magnetic pole part 18, excitation path poles 1a, 1b, a field magnet 19, and a rotor support 1e. Two armatures form a line axially while facing the rotor, a left armature is a first armature magnetic pole group having magnetic teeth 14, a cylindrical magnetic yoke 15 and armature coils 16, and a right armature is a second armature magnetic pole group having magnetic teeth 17, the cylindrical magnetic yoke 15 and armature coils not shown in the figure.

A magnetic excitation part is arranged in the rotor and in the housing side of both rotor ends. In the rotor, the field magnet 19 with successively changing radial thickness is arranged between excitation path poles 1a and 1b, the excitation path pole 1a faces an annular magnetic core 1d leading to the cylindrical magnetic yoke 15 in the right side of the rotor through a minute gap, an excitation coil 1c is arranged so that the magnetic flux may be generated in magnetic flux path consisting of the annular magnetic core 1d, the cylindrical magnetic yoke 15, the magnetic teeth 14, the surface magnetic pole part 18, the excitation path pole 1b, the field magnet 19, the excitation path pole 1a. The number 1f indicates a non-magnetic member, and arrows in the field magnet 19 indicate the magnetization direction. Although, an annular magnetic core and an excitation coil arranged at a left-side end of the rotor are not numbered, disposition thereof is same with the above, and the same number is used for a component of the same kind.

Figure 2:
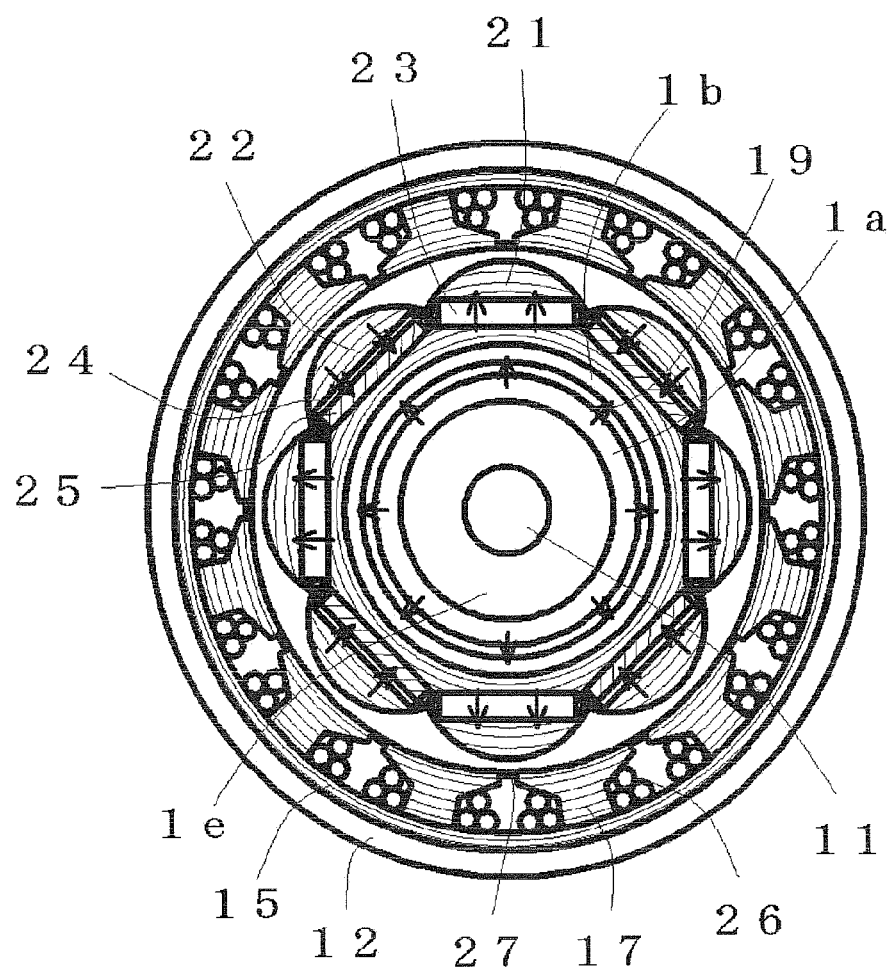
FIG. 2 is a sectional view showing an armature and a rotor of the rotating electric machine apparatus shown in FIG. 1.

FIG. 2 illustrates a sectional view of the armature and the rotor along A-A' of FIG. 1, and some of component parts are appended with numbers for explaining the reciprocal relation. In the surface magnetic pole part 18, island-shaped magnetic poles 21 and magnetic salient poles 22 with the shape protruding in radial direction respectively are arranged alternately in circumferential direction. Permanent magnets 23 are arranged in an inner part of the island-shaped magnetic poles 21, permanent magnets 24 and magnetic plates 25 are arranged in an inner part of the magnetic salient poles 22. The magnetization direction of adjacent permanent magnets 23, 24 is made reverse each other, the island-shaped magnetic poles 21 and the magnetic salient poles 22 are magnetized respectively in an N pole and an S pole. Arrows in the permanent magnets 23, 24 indicate the magnetization direction.

The permanent magnets 23, 24 are isolation members, the thickness of the permanent magnet 23 is set as bigger than the thickness of the permanent magnet 24 so that magnetic flux coming from the magnetic excitation part is hard to pass through the island-shaped magnetic poles 21. The magnetic plate 25 is a magnetic material with the almost same specific gravity as the permanent magnets 23 and 24, and it is arranged so that the rotor weight balance may not be spoiled. The island-shaped magnetic poles 21 and the magnetic salient poles 22 that are conjugated by small width saturable magnetic junctions are composed by punching out a silicon steel plate by a predetermined die and then stacking the punched plates. Then permanent magnet plates are inserted into slots corresponding to the permanent magnet plates 23, 24, and magnetic plates are also inserted into slots corresponding to the magnetic plate 25. The excitation path poles 1a, 1b consist of powder magnetic core, and magnetic flux coming from the magnetic excitation part can pass through them.

In FIG. 2, the sectional view of the second armature magnetic pole group is shown. The second armature magnetic pole group is composed of the cylindrical magnetic yoke 15 fixed to the housing 12, a plurality of magnetic teeth 17 extending radially from the cylindrical magnetic yoke 15 and having non-magnetic portions in the circumferential direction, and the armature coils 26 wound around the magnetic teeth 17. Saturable magnetic junctions 27 that are short in the radial direction are provided between the contiguous edges of the magnetic teeth 17. The magnetic teeth 17 and the saturable magnetic junctions 27 are punched out of a silicon steel plate by a predetermined die and stacked and wound with the armature coils 26, and then, combined with the cylindrical magnetic yoke 15 composed of powder magnetic core, and thereby the armature is produced.

In the armature shown in FIG. 2, the armature coils 26 and the magnetic teeth 17 belonging to the second armature magnetic pole group are arranged in the circumferential direction. Armature coils of U'-phase, V'-phase, and W'-phase is arranged repeatedly in circumferential direction, 12 armature coils 26 are arranged to eight magnetic poles of the rotor. The armature arranged left-hand side in FIG. 1 is the first armature magnetic pole group, and the composition is the same as the second armature magnetic pole group that shows in FIG. 2. Armature coils 16 of U-phase, V-phase, and W-phase are arranged repeatedly in circumferential direction, 12 armature coils are arranged to eight magnetic poles of the rotor.

Figure 3A:
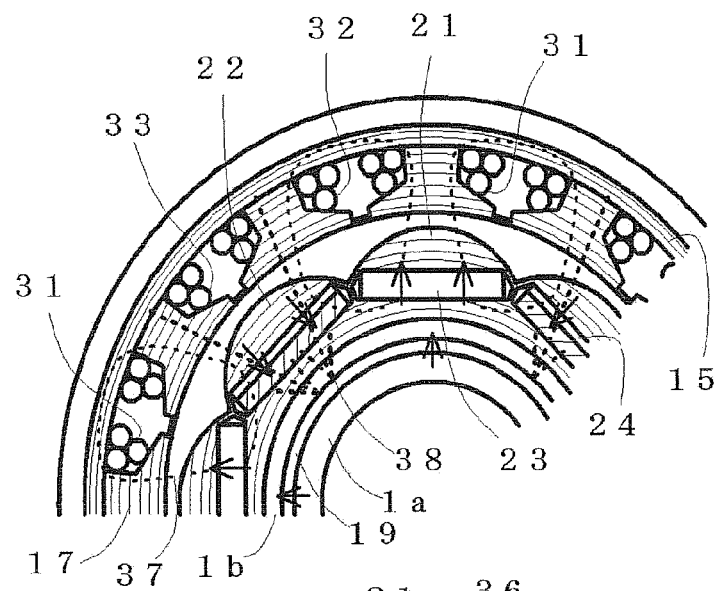
FIGS. 3A and 3B are showing magnetic flux flow and a magnified sectional views showing an armature and the rotor shown in FIG. 2.
Figure 3B:
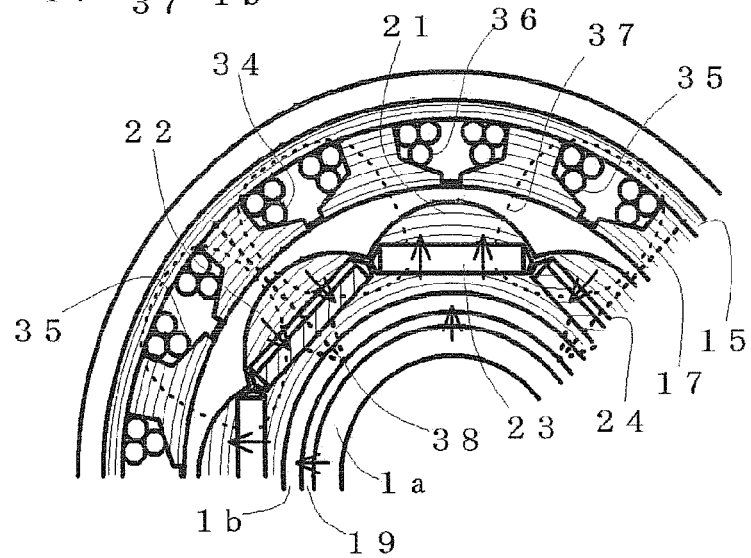

FIGS. 3A, 3B are showing magnetic flux flow and a magnified sectional view of the armature and the surface magnetic pole part 18 shown in FIG. 2, the flow of the magnetic flux coming from the permanent magnets 23, 24 and the magnetic excitation part is shown. FIG. 3A shows a sectional view of the surface magnetic pole part 18 and the first armature magnetic pole group, FIG. 3B shows a sectional view of the surface magnetic pole part 18 and the second armature magnetic pole group. FIGS. 3A, 3B indicate the case where the magnetic excitation part increases flux amount crossing the armature coils 16, 26 more than the cases of permanent magnets 23 and 24 only.

In FIG. 3A, armature coils of the first armature magnetic pole group are shown as armature coils 31, 32, and 33 in the armature coils of U-phase, V-phase, and W-phase, respectively. In FIG. 3B, armature coils of the second armature magnetic pole group are shown as armature coils 34, 35, and 36 in the armature coils of U'-phase, V'-phase, and W'-phase, respectively. Armature coils of two groups are configured so that when U phase armature coil 31 faces the island-shaped magnetic pole 21, U'-phase armature coil 34 may face the magnetic salient pole 22. U-phase armature coil 31 and U'-phase armature coil 34 are connected in series to generate magnetic flux in the opposite direction when current is flowed. V-phase armature coil 32 and V'-phase armature coil 35, W-phase armature coil 33 and W'-phase armature coil 36 are similarly connected respectively, and all of armature coils are wired to 3 phase as a whole.

Dotted lines 37 represent magnetic flux coming from the permanent magnets 23, 24. In FIG. 3A, the magnetic flux 37 which came out from N pole of the permanent magnet 23 returns to the S pole of the permanent magnet 23 through the island-shaped magnetic pole 21, the magnetic teeth 14, the cylindrical magnetic yoke 15, the adjacent magnetic teeth 14, the permanent magnet 24, and the magnetic salient pole 22. In FIG. 3B, the magnetic flux 37 which came out from N pole of the permanent magnet 23 returns to the S pole of the permanent magnet 23 through the island-shaped magnetic pole 21, the magnetic teeth 17, the cylindrical magnetic yoke 15, the adjacent magnetic teeth 17, the permanent magnet 24, and the magnetic salient pole 22. The direction of the magnetic flux 37 crossing U-phase armature coil 31 is opposite to the magnetic flux 37 crossing U'-phase armature coil 34 each other, the direction of the magnetic flux 37 crossing V-phase armature coil 32 is opposite to the magnetic flux 87 crossing V'-phase armature coil 35 each other, the direction of the magnetic flux 37 crossing W-phase armature coil 33 is opposite to the magnetic flux 37 crossing w'-phase armature coil 36 each other. Therefore, the generation voltage by the magnetic flux 37 coming from permanent magnets 23 and 24 is correctly synthesized as three-phase induced voltage, voltage output waveform of three phase is not influenced even if there is unbalance between the flux amounts flowing through the island-shaped magnetic pole 21 and the magnetic salient pole 22 which are adjacent salient poles.

The magnetic flux coming from the magnetic excitation part flows between the cylindrical magnetic yoke 15 and the excitation path pole 1*a* in FIGS. 3A and 3B as shown by number 38. The thickness of the permanent magnet 23 is established bigger than the thickness of the permanent magnet 24, so the magnetic flux 38 hardly flows to the island-shaped magnetic pole 21 and flows between the magnetic salient pole 22 and the magnetic teeth solely. In general, the magnetic flux amount coming from the permanent magnet is fixed mostly and permeability of permanent magnets is close to an air gap, so the permanent magnet with big thickness can be applied as the isolation member of the bi-directional magnetic flux coming from the outside. Permanent magnets 23 and 24 near the armature are composed of neodymium magnet (NdFeB) with large coercivity, the magnetic flux 38 coming from the magnetic excitation part is not strong to influence the magnetization state of permanent magnets 23 and 24 in this embodiment.

The magnetic flux 38 and 37 cross in a same direction the V-phase armature coil 32, W-phase armature coil 33, U'-phase armature coil 34, so the magnetic excitation part increases flux amount crossing the armature coils coming from the case of permanent magnets 23 and 24 only. When the direction of the magnetic flux 38 is opposite with FIGS. 3A and 3B, the magnetic excitation part decreases flux amount crossing the armature coils coming from the case of permanent magnets 23 and 24 only.

The magnetic flux 38 flows in the armature through the magnetic salient poles 22 solely, and the voltage caused by each armature coil is not uniform. However, in same phase armature coils that driving current is supplied simultaneously in the first and the second armature magnetic pole groups, when one faces the island-shaped magnetic pole 21, the other faces the magnetic salient pole 22. And they are connected in series to produce a flux in the opposite direction each other when current is flowed. Therefore, torque fluctuation and voltage waveform distortion are suppressed.

As shown in FIG. 1, the gap length between the excitation path poles 1*a* and 1*b* changes gradually in axial direction, and the field magnet 19 with continuously changing radial thickness is arranged. That is, the field magnet 19 is parallel connection of magnet elements with different length. When excitation current is supplied to the excitation coil 1*c*, magnetic potential difference (magnetomotive force) between the excitation path poles 1*a* and 1*b* is almost same in axial direction, and magnetic field intensity equivalent to the value in which the magnetic potential difference is divided by the gap length is added in each magnet elements.

Therefore, a short magnet element is easy to be magnetized, and a long magnet element is hard to be magnetized. When the field magnet 19 is excited collectively by the excitation current supplied to the excitation coil 1*c*, magnetic flux concentrates on shorter magnet elements by which the magnetic field strength becomes bigger, and magnet elements where magnetic field strength becomes larger than coercivity are magnetized. When the excitation current supplied to the excitation coil 1*c* is increased, the field magnet area that magnetization is changed spreads out toward a long magnet element. Thus, magnetization state of the field magnet can be controlled.

The permanent magnets 23, 24 arranged near the island-shaped salient poles and the magnetic salient poles and the field magnet consist of permanent magnet material. Since the permanent magnets 23, 24 are exposed to magnetic flux generated by the armature coils, they are composed of neodymium magnet with great product of thickness and coercivity. The product of thickness and coercivity in the field magnet is set up so that a magnetization change may be made by the excitation coil.

The minimum thickness of the field magnet considers it as size from the sum of gap length between the magnetic teeth 17 and the magnetic salient pole 22, and gap length between the annular magnetic core 1d and the excitation path pole 1a, and it is desirable that magnetic flux coming from bigger thickness magnet element is hard to concentrate on smaller thickness magnet element. Further the excitation path pole 1a is desirable to have magnetic saturation flux density almost equal to that of the magnet elements. Magnetic resistance becomes big to magnetic flux concentration beyond saturation flux density for the excitation path pole 1a, so magnetic flux from bigger thickness magnet element is hard to concentrate on smaller thickness magnet element.

The field magnet 19 is composition that magnet elements with different magnetization easiness are connected in parallel between the excitation path poles 1a and 1b, as explained above. The width of the area magnetized is changed with amplitude of the excitation current added to the excitation coil 1c, and magnetization direction depends on polarity of the excitation current. Areas with different magnetization direction coexists in the field magnet 19 as shown in FIG. 1. And flux amount flowing into the armature side can be changed by changing the magnetic pole area of each magnetization area. As explained using FIGS. 3A and 3B, when flux flows into the excitation path pole 1b side from the cylindrical magnetic yoke 15, flux amount crossing the armature coils 16 and 26 are increased effectually, so the magnetization of inside diameter direction corresponds to the first magnetization, and the magnetization of outside diameter direction corresponds to the second magnetization.

Figure 4A:
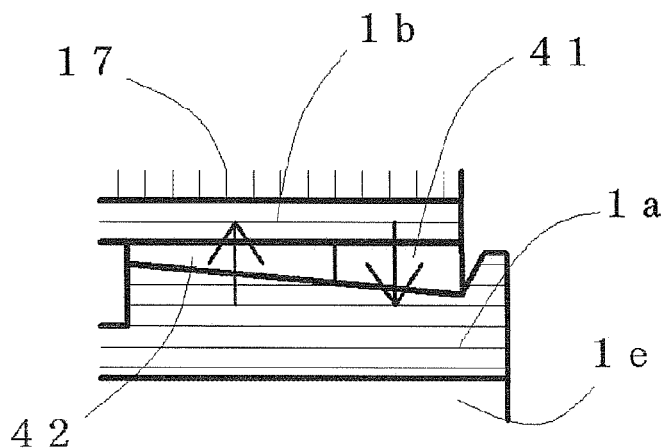
FIGS. 4A, 4B, and 4C show the drawing of longitudinal section in the upper half of the magnetic excitation part of the rotating electric machine shown in FIG. 1.
Figure 4B:
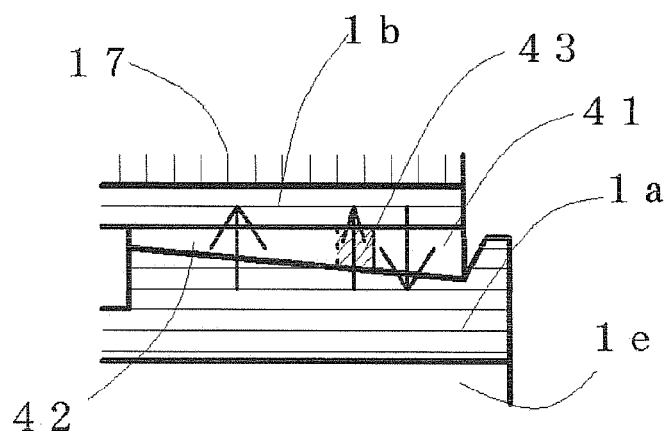
Figure 4C:
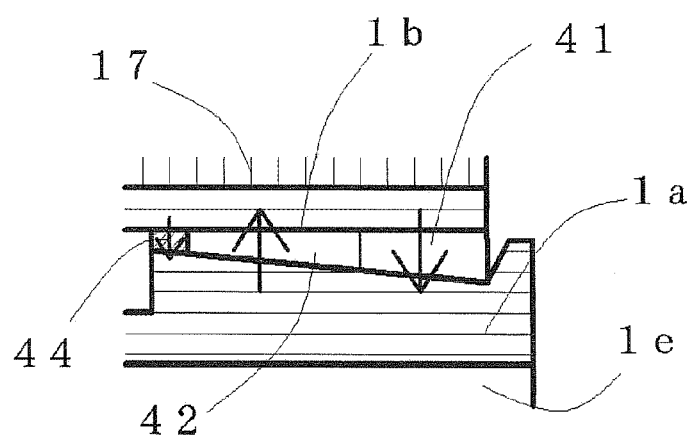

FIGS. 4A, 4B, and 4C show the drawing of longitudinal section in the upper half of the field magnet, the step to change magnetization state of the field magnet 19 will be explained. A field magnet region 41 indicates the first magnetization, and a field magnet region 42 indicates the second magnetization, respectively. All the magnet elements having smaller coercivity than magnetic field intensity applied in the field magnet by the excitation coil 1c are magnetized in same direction, so magnetization change of the field magnet is executed as follows.

When magnetic pole area of the field magnet region 41 that is the first magnetization is to be decreased, magnetic pole area of the field magnet region 42 that is the second magnetization is to be expanded. The field magnet region 42 has shorter length in radial direction than the field magnet region 41, so the excitation current with amplitude and polarity so as to expand the field magnet region 42 is added to the excitation coil 1c to reduce magnetic pole area of the field magnet region 41 from a state of FIG. 4A. That is, the excitation current with amplitude and polarity to magnetize the enlarged field magnet region 42 towards the second magnetization is added to the excitation coil 1c. A shaded portion 43 in the field magnet region 42 corresponds to an increased part of the field magnet region 42 (a decreased pole area of the field magnet region 41) in FIG. 4B.

In case to increase magnetic pole area of the field magnet region 41 from state of FIG. 4A, the excitation current having following amplitude and polarity is supplied to the excitation coil 1c. The amplitude and polarity thereof is set up so that region equivalent to expanded area of the first magnetization in the shortest radial length part may be magnetized towards the first magnetization. A shaded portion 44 corresponds to an increased part of the first magnetization in FIG. 4C. In the state of FIG. 4C, magnetic pole area of the first magnetization becomes sum of the magnetic pole area of the field magnet region 41 and the magnetic pole area of the shaded part 44.

Thus, changing the excitation current supplied to the excitation coil 1c, and changing magnetic pole area corresponding to the first magnetization and the second magnetization, flux amount flowing through the armature coils 16, 26 is controlled. Relationship between flux amount flowing through the armature and the excitation current is set as map data in design phase. However, in mass-production stage of rotating electric machines, precise control of flux amount flowing through the armature may become difficult in presence of variation in component dimension and magnetic property. In such case, the above-mentioned relationship is inspected after assembly of the rotating electric machine, and the above-mentioned map data is corrected.

Furthermore, magnetic substance tends to receive influence by temperature, and when there is also anxious about aging changes, information to correct the above-mentioned map data can be studied by supervising relationship between the excitation current and magnetization state during operation of the rotating electric machine. It is difficult to grasp flux amount flowing through the armature directly, but the flux amount is estimated by referring to generated voltage of the armature coils 16, 26.

For example, induced voltage amplitude appearing in armature coils 16 and 26 is proportional to flux amount crossing armature coils 16 and 26, and rotating speed. Parameters related to the excitation current are corrected so that amplitude of the excitation current on same conditions is increased in case that amplitude change of induced voltage is smaller than expected value as result of having added the excitation current to the excitation coil 1c so as to increase magnetic pole area of the field magnet region 41, and is decreased in case that amplitude change of induced voltage is larger than expected value.

In this embodiment, magnetization state of the field magnet 19 can continuously be changed. However, magnetization state of the field magnet 19 will be changed discretely substantially when changing a magnetization state intermittently. Further in this embodiment, the flux adjustment current of a degree which does not make the field magnet 19 cause irreversible magnetization change is supplied to the excitation coil 1c in each magnetization state of the field magnet 19, and induced flux is superimposed on flux coming from the field magnet 19 and permanent magnets 23, 24, and flux amount flowing through the armature is controlled. In this case, magnetic flux for adjustment will flow through small thickness part in the field magnet 19 mainly.

Figure 5:
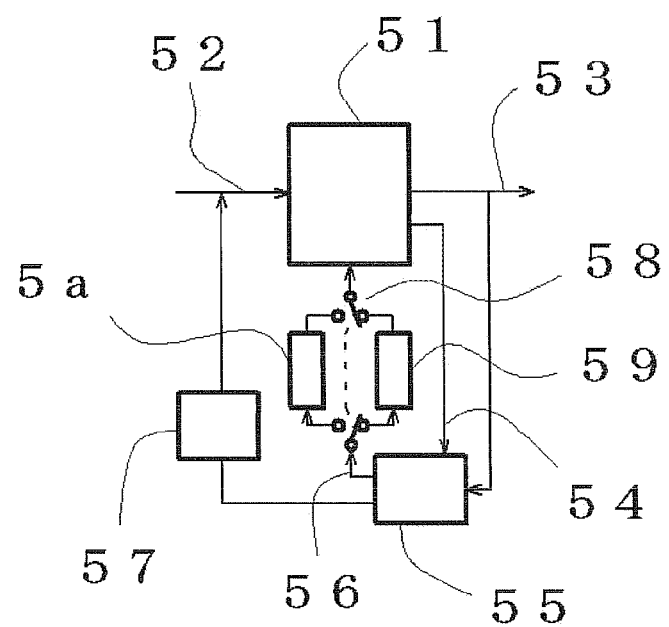
FIG. 5 is a block diagram of a rotating electric machine system for controlling magnetic flux amount.

FIG. 5 shows a block diagram of the rotating electric machine system for controlling the flux amount. In FIG. 5, the rotating electric machine apparatus 51 has an input 52 and an output 53, and a control device 55 controls the flux amount through a control signal 56 referring to an output 53 and a state signal 54 including positions of the rotor and temperature etc. The number 57 represents a driving circuitry supplying a driving current to the armature coils 16, 26. If the rotating electric machine apparatus 51 is used as an electric generator, the input 52 is a rotational force and the output 53 is the electric power. If the rotating electric machine apparatus 51 is used as an electric motor, the input 52 is a driving current supplied to the armature coils 16, 26 from the driving circuitry 57 and the output 53 is a rotational torque or a rotational speed. The control signal 56 controls a switch 58, a magnetization control circuitry 5a and a flux adjustment circuitry 59. When changing the magnetization state of the field magnet, the magnetization control circuitry 5*a* is connected by the switch 58 and the excitation current will be supplied to the excitation coil 1*c*. When adjusting the flux amount crossing the armature coils 16, 26, the flux adjustment circuitry 59 is connected by the switch 58 and the flux adjustment current will be supplied to the excitation coil 1*c*.

A rotating electric machine system in which the rotating electric machine apparatus serves as an electric motor and by which the flux amount control is performed to optimize the rotational force control will be explained. The flux adjustment current to increase the flux amount flowing through the armature is assumed as positive in the explanation. When the rotational speed that is the output 53 becomes larger than a predetermined value and the flux amount flowing through the armature is made to be smaller, the flux adjustment current being supplied to the excitation coil 1*c* from the flux adjustment circuitry 59 is decreased. When the flux adjustment current is smaller than a predetermined value in the case, an excitation current to increase magnetic pole area of the second magnetization is supplied to the excitation coil 1*c* from the magnetization control circuitry 5*a*, and magnetic pole area of the first magnetization is decreased as well as magnetic pole area of the second magnetization is increased, and the flux amount flowing through the armature is made smaller. For example, to expand the second magnetization from a state of FIG. 4A, the excitation current with amplitude and polarity to magnetize the enlarged field magnet region 42 towards the second magnetization is supplied to the excitation coil 1*c*. A shaded portion 43 in the field magnet region 42 corresponds to an increased part of the field magnet region 42 (a decreased pole area of the field magnet region 41) in FIG. 4B.

When the rotational speed that is the output 53 becomes smaller than a predetermined value and the flux amount flowing through the armature is made to be larger, the flux adjustment current being supplied to the excitation coil 1*c* from the flux adjustment circuitry 59 is increased. When the flux adjustment current is larger than a predetermined value in the case, an excitation current to increase magnetic pole area of the first magnetization is supplied to the excitation coil 1*c* from the magnetization control circuitry 5*a*, and the magnetic pole area of the first magnetization is increased as well as the magnetic pole area of the second magnetization is decreased, and the flux amount flowing through the armature is made larger. For example, to expand the first magnetization from a state of FIG. 4A, the excitation current with amplitude and polarity to magnetize a region equivalent to an expanded part (a shaded portion 44 in FIG. 4C) of the first magnetization in the second magnet region 42 towards the first magnetization is added to the excitation coil 1*c*.

A constant-voltage power generation system in which the rotating electric machine apparatus serves as an electric generator and by which the flux amount control is performed to control the power generation voltage to be a predetermined voltage will be explained.

When the power generation voltage that is the output 53 becomes larger than a predetermined value and the flux amount flowing through the armature is made to be smaller, the flux adjustment current being supplied to the excitation coil 1*c* from the flux adjustment circuitry 59 is decreased. When the flux adjustment current is smaller than a predetermined value in the case, an excitation current to increase the magnetic pole area of the second magnetization is supplied to the excitation coil 1*c* from the magnetization control circuitry 5*a*, and the magnetic pole area of the first magnetization is decreased as well as the magnetic pole area of the second magnetization is increased, and the flux amount flowing through the armature is made smaller.

When the power generation voltage that is the output 53 becomes smaller than a predetermined value and the flux amount flowing through the armature is made to be larger, the flux adjustment current being supplied to the excitation coil 1*c* from the flux adjustment circuitry 59 is increased. When the flux adjustment current is larger than a predetermined value in the case, an excitation current to increase the magnetic pole area of the first magnetization is supplied to the excitation coil 1*c* from the magnetization control circuitry 5*a*, and the magnetic pole area of the first magnetization is increased as well as the magnetic pole area of the second magnetization is decreased, and the flux amount flowing through the armature is made larger.

The thickness of the field magnet changes continuously axially in this embodiment, it is possible to adopt both of the constitution with the thickness which changes to circumferential direction or the constitution which has more than one field magnet element with different thickness discretely between the magnetic material.

In this embodiment, an excitation flux for making a magnetization change of the field magnet flows through the armature coils, and generates voltage in the armature coils. The voltage amplitude appearing in the armature coils can be reduced by applying the excitation current having waveform with gradual time change as much as possible. (The waveform is synonymous to a waveform that frequency spectrum concentrates on the low frequency side.) For example, a raised cosine pulse and a Gaussian pulse, etc. are effective as excitation current waveform supplied to the excitation coil to suppress the voltage amplitude.

Although the field magnet is configured in parallel with different thickness of the magnet elements in this embodiment, the field magnet with similar features can consist of the magnet elements with constant thickness and different coercivity in parallel. In case of the latter, the magnetic resistance which regarded each magnet element as a gap is constant, so magnetic flux concentration to the magnet element with small thickness is avoided, and the above composition can be achieved easily by parallel connection of magnet element with the different magnet material.

The rotating electric machine system according to a second embodiment of the present invention will be explained by using FIGS. 6 to 9. The second embodiment is a rotating electric machine system having a radial gap structure and a magnetic excitation part in a static side.

Figure 6:
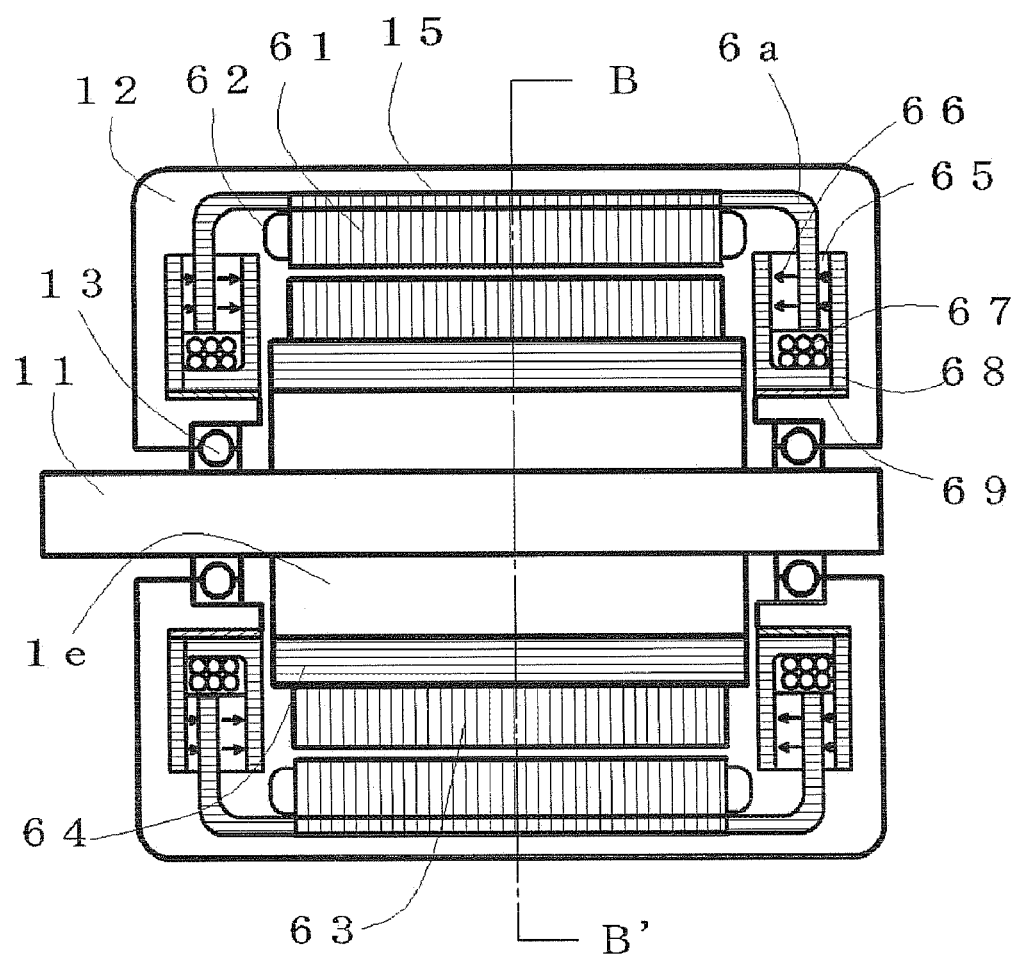
FIG. 6 is a longitudinal sectional view of the rotating electric machine apparatus according to a second embodiment of the present invention.

FIG. 6 shows a longitudinal sectional view of the embodiment in which the present invention is applied to a rotating electric machine apparatus having a radial gap structure, and a rotational shaft 11 is supported rotatably by a housing 12 through bearings 13. The armature includes a cylindrical magnetic yoke 15 fixed to the housing 12, a plurality of magnetic teeth 61, and a armature coils 62. The rotor includes a surface magnetic pole part 63, a cylindrical magnetic core 64, a rotor support 1*e*, and may rotate with the rotational shaft 11. The surface magnetic pole part 63 has an island-shaped magnetic poles embedded in a cylindrical magnetic substrate and a magnetic salient poles that are a part of the cylindrical magnetic substrate alternately in circumferential direction. Magnetic excitation parts are arranged at the housing side of rotor both ends, and respectively combined magnetically with the cylindrical magnetic core 64 and the cylindrical magnetic yoke 15 so that magnetic flux may be passed between the cylindrical magnetic core 64 and the cylindrical magnetic yoke 15.

In the figure, the magnetic excitation part facing a right-side end of the cylindrical magnetic core 64 with a minute gap includes a excitation path pole 6a, a excitation path pole 68, a first magnet element 65, a second magnet element 66, an excitation coil 67, and is arranged at the housing 12. That is, a field magnet consists of the first magnet element 65 and the second magnet element 66, parameters, such as each magnetic pole surface area and saturation magnetic flux density, etc. are set up so that the first magnet element 65 and the second magnet element 66 may flow almost an equivalent amount of magnetic flux to the armature side, respectively. Arrows in the first magnet element 65 and the second magnet element 66 indicate the magnetization direction. The number 69 indicates a conductor layer arranged so that inductance of the excitation coil 67 may be decreased and induced magnetic flux may be concentrated in a flux path. Although, parts of the magnetic excitation part facing a left-side end of the cylindrical magnetic core 64 are not numbered, composition thereof is same with the above, and the same number is used for a component of the same kind.

Figure 7:
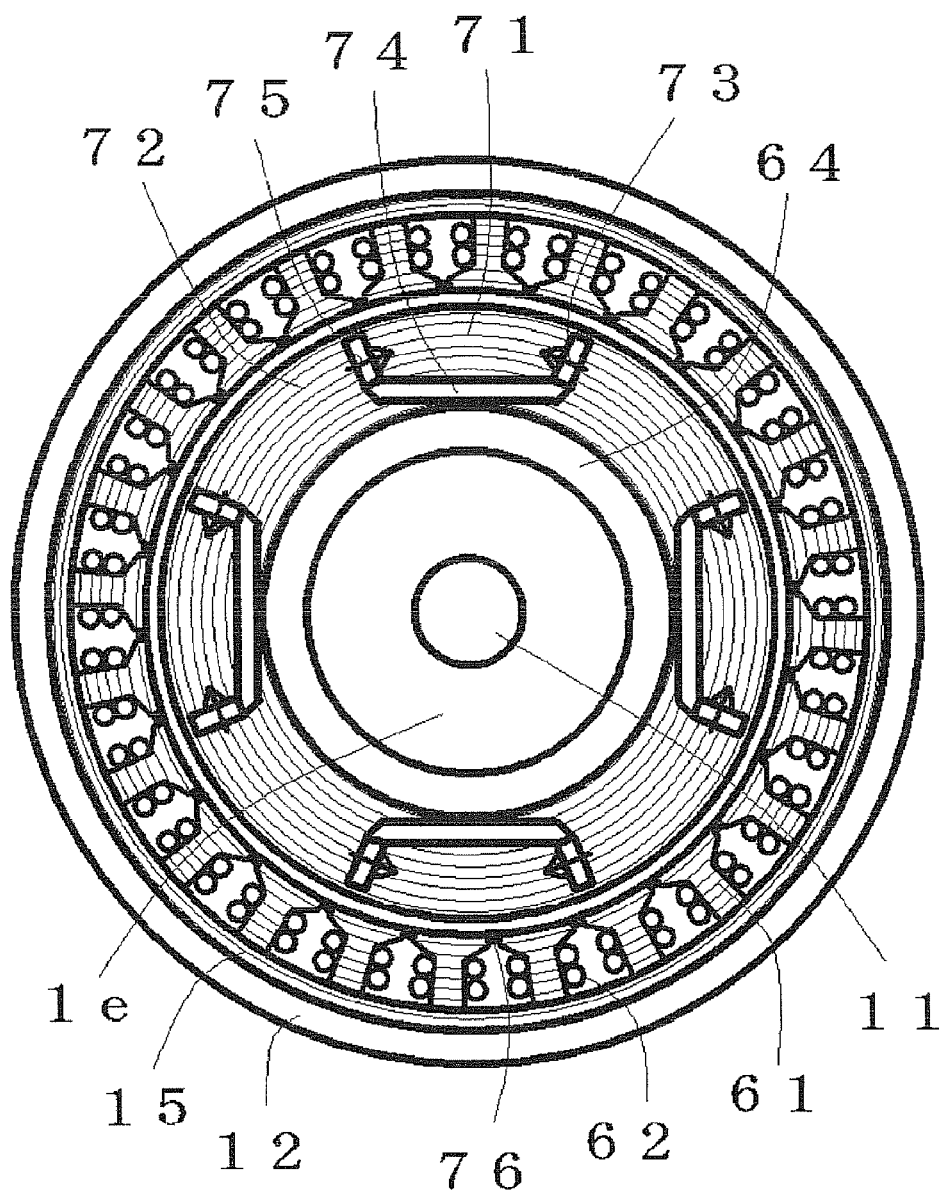
FIG. 7 is a sectional view showing an armature and a rotor of the rotating electric machine apparatus shown in FIG. 6.

FIG. 7 illustrates a sectional view of the armature and the rotor along B-B' of FIG. 6, and some of component parts are appended with numbers for explaining the reciprocal relation. In the rotor, island-shaped magnetic poles 71 and magnetic salient poles 72 are formed by permanent magnets arranged at equal intervals mostly in circumferential direction into the cylindrical magnetic substrate. Furthermore, circumferential direction of adjacent permanent magnet magnetization is reversed alternately, and the island-shaped magnetic poles 71 and the magnetic salient poles 72 are magnetized in a different polarity with each other. In this embodiment, the island-shaped magnetic poles 71 and the magnetic salient poles 72 are magnetized respectively in N pole and S pole, and face the armature. The permanent magnets on both sides of the island-shaped magnetic poles 21 are shown as permanent magnets 73 and 75, respectively, arrows in the permanent magnets 73 and 75 show the magnetization direction. In addition, non-magnetic members 74 are disposed as isolation members in the island-shaped magnetic poles 71 so that magnetic flux coming from the magnetic excitation part is hard to pass through. That is, the island-shaped magnetic poles 71 are a part that is separated like an island by permanent magnets 73 and 75 and the non-magnetic members 74. The magnetic salient poles 72 are connected to the cylindrical magnetic core 64 at its inner side, and magnetic flux coming from the magnetic excitation part can pass through in radial direction. An isolation member is not arranged between the magnetic salient poles 72 and the cylindrical magnetic substrate.

The island-shaped magnetic poles 71 and the magnetic salient poles 72 that are conjugated by small width saturable magnetic junctions are composed by punching out a silicon steel plate by a predetermined die and then stacking the punched plates. Then permanent magnet plates are inserted into slots corresponding to the permanent magnet plates 73, 75, and stainless steel blocks are also inserted into slots corresponding to the non-magnetic member 74. The cylindrical magnetic core 64 consists of soft iron blocks, and makes the magnetic flux coming from the magnetic excitation part pass through axially. The island-shaped magnetic poles 71, the magnetic salient poles 72, and the cylindrical magnetic core 64 can also be configured as one in powder magnetic core with large specific resistance.

The armature is composed of the cylindrical magnetic yoke 15 fixed to the housing 12, a plurality of magnetic teeth 61 extending radially from the cylindrical magnetic yoke 15 and having non-magnetic portions in the circumferential direction, and the armature coils 62 wound around the magnetic teeth 61. Saturable magnetic junctions 76 that are short in the radial direction are provided between the contiguous edges of the magnetic teeth 61. The magnetic teeth 61 and the saturable magnetic junctions 76 are punched out of a silicon steel plate by a predetermined die and stacked and wound with the armature coils 62, and then, combined with the cylindrical magnetic yoke 15 composed of powder magnetic core, and thereby the armature is produced.

The saturable magnetic junctions 76 improve the support strength of the magnetic teeth 61 integrally with the magnetic teeth 61, and suppress unnecessary vibration of the magnetic teeth 61. The radial length of each of the saturable magnetic junctions 76 is set to be short, and thereby, the shape thereof that is easy to be magnetically saturated. Therefore, the junctions 76 are easy to be saturated with the magnetic flux generated by the armature coils 62 or the magnetic flux from the field magnet, and in such a case, the shorted amount of the magnetic flux generated by the armature coils 62 and the magnetic flux is made to be small. When a current is supplied to the armature coils 62, the saturable magnetic junctions 76 are magnetically saturated and then begin to leak the magnetic flux, along with time passing. The border of the effective non-magnetic portions appearing in the saturable magnetic junctions 76 that are magnetically saturated is not clear, and therefore, the distribution of the leaking magnetic flux becomes mild, and also in this point, the saturable magnetic junctions 76 contribute to the suppression of vibration with moderating time change of the force applied to the magnetic teeth 61.

In the armature shown in FIG. 7, the armature coil 62 and the magnetic teeth 61 belonging to each of the first armature magnetic pole group and the second armature magnetic pole group are arranged in different positions in circumferential direction. Armature coils of U-phase, V-phase, W-phase, U'-phase, V'-phase, and W'-phase are arranged repeatedly in circumferential direction, 24 armature coils are arranged to eight magnetic poles of the rotor. Armature coils of U phase, V-phase, and W-phase belong to the first armature magnetic pole group, and armature coils of U'-phase, V'-phase, and W'-phase belong to the second armature magnetic pole group. U-phase and U'-phase indicate same phase, V-phase and V'-phase indicate same phase, W-phase and W'-phase indicate same phase, respectively.

Figure 8:
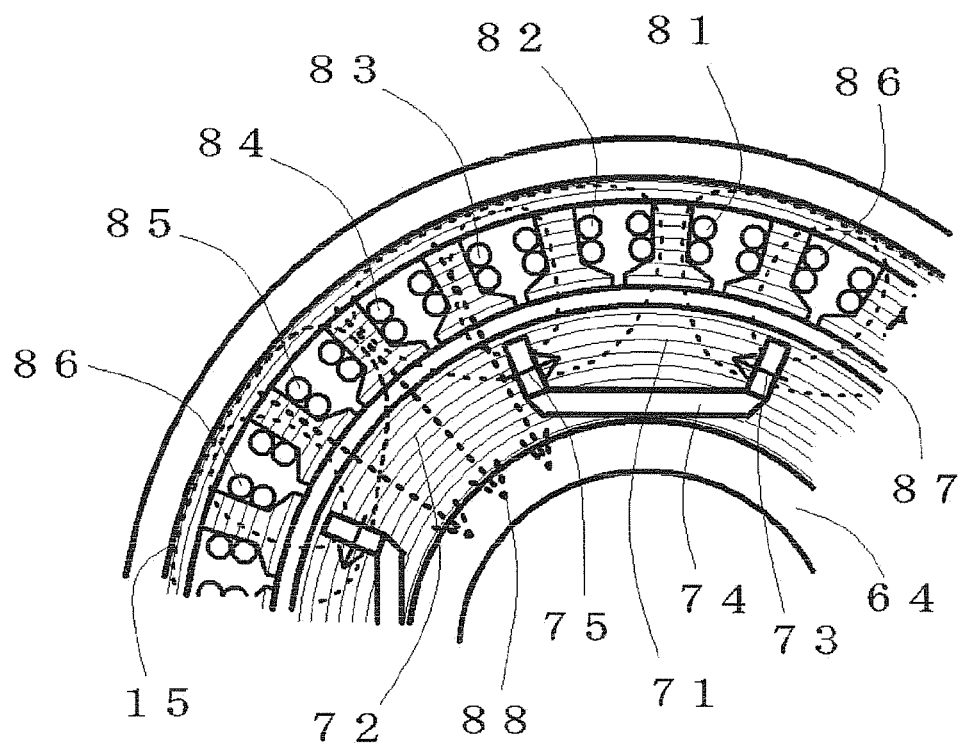
FIG. 8 is showing magnetic flux flow and a magnified sectional view showing an armature and the rotor shown in FIG. 7.

FIG. 8 is showing magnetic flux flow and a magnified sectional view of the armature and the rotor shown in FIG. 7, the flow of the magnetic flux coming from the permanent magnets 73, 75 and the magnetic excitation part is shown. FIG. 8 indicates the case where the magnetic excitation part increases flux amount crossing the armature coil 62 more than the cases of permanent magnets 73 and 75 only.

In FIG. 8, armature coils of the first armature magnetic pole group are shown as armature coils 81, 82, and 83 in the armature coils of U-phase, V-phase, and W-phase, respectively. Armature coils of the second armature magnetic pole group are shown as armature coils 84, 85, and 86 in the armature coils of U'-phase, V'-phase, and W'-phase, respectively. Armature coils of two groups are configured so that U'-phase armature coil 84 may face the magnetic salient pole 72 when U phase armature coil 81 faces the island-shaped magnetic pole 71. U-phase armature coil 81 and U'-phase armature coil 84 are connected in series to generate magnetic flux in the opposite direction when current flowed. V-phase armature coil 82 and V'-phase armature coil 85, W-phase armature coil 83 and W'-phase armature coil 86 are similarly connected respectively, and all of armature coils are wired to 3 phase as a whole.

Dotted lines 87 represent magnetic flux coming from the permanent magnets 73, 75. The direction of the magnetic flux 87 crossing U-phase armature coil 81 is opposite to the magnetic flux 87 crossing U'-phase armature coil 84 each other, the direction of the magnetic flux 87 crossing V-phase armature coil 82 is opposite to the magnetic flux 87 crossing V'-phase armature coil 85 each other, the direction of the magnetic flux 87 crossing W-phase armature coil 83 is opposite to the magnetic flux 87 crossing w'-phase armature coil 86 each other. Therefore, the generation voltage by the magnetic flux 87 coming from permanent magnets 73 and 75 is correctly synthesized as three-phase induced voltage, voltage output waveform of three phase is not influenced even if there is unbalance between the flux amounts flowing through the island magnetic pole 71 and the magnetic salient pole 72 which are adjacent salient poles.

In FIG. 8, flux coming from the magnetic excitation part is indicated by number 88, is obstructed by the non-magnetic members 74, does not flow through the island-shaped magnetic poles 71 and flows radially through the magnetic salient poles 72 solely. When the direction of the magnetic flux 88 is made an opposite direction with the magnetization direction of the island-shaped magnetic poles 71 by permanent magnets 73, 75, directions of the magnetic flux 87 and 88 crossing W-phase armature coil 83, U'-phase armature coil 84, and V'-phase armature coil 85 are the same. Therefore, the magnetic excitation part increases flux amount crossing the armature coils more than the case of only permanent magnets 73 and 75. When the direction of the magnetic flux 88 is made into an opposite direction in FIG. 8, the magnetic excitation part decreases flux amount crossing the armature coils more than the case of only permanent magnets 73 and 75.

The magnetic flux 88 coming from the magnetic excitation part flows through the magnetic salient poles 72 solely in radial direction, and the generated voltage is not the same in each armature coil. However, armature coils of the first armature magnetic pole group and the second armature magnetic pole group are placed at different circumferential position as described above, in armature coils belonging to the same phase that drive current is supplied at the same time, when one faces the island-shaped magnetic pole 71, other is arranged to face the magnetic salient pole 72, and they are connected in series to produce a flux in the opposite direction each other when current is flowed. Therefore, drive torque fluctuations or a generation voltage waveform distortion is restrained.

Figure 9A:
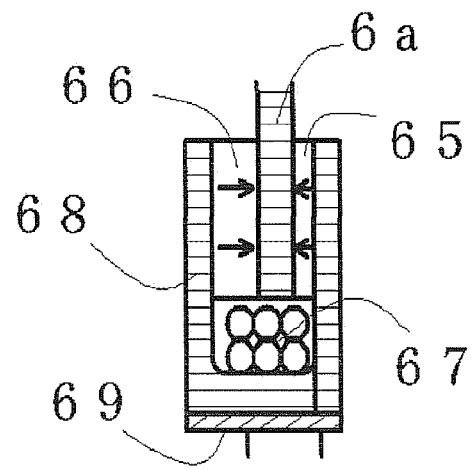
FIGS. 9A, 9B, and 9C are longitudinal sectional views of upper half of the magnetic excitation part of the rotating electric machine shown in FIG. 6.
Figure 9B:
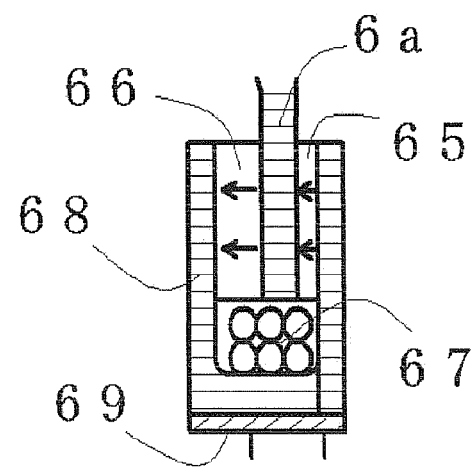
Figure 9C:
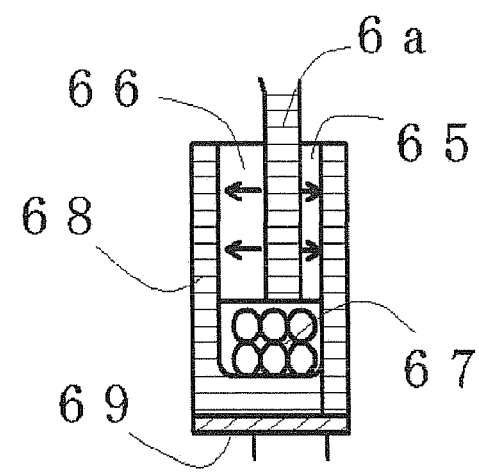

FIGS. 9A, 9B, and 9C show the drawing of longitudinal section in the upper half of the magnetic excitation part facing the right end of the rotor, and show different magnetization states of the first magnet element 65 and the second magnet element 66, respectively. The first magnet element 65, the second magnet element 66, the excitation coil 67, excitation path poles 6a and 68, and the conductor layers 69 which constitute the principal part of the magnetic excitation part are shape around the rotational shaft 11. The excitation coil 67 is arranged so that magnetic flux may be induced in closed magnetic path constituted from the excitation path pole 6a, the first magnet element 65, the excitation path pole 68, and the second magnet element 66. In addition, the magnetic flux coming from the first magnet element 65 and the second magnet element 66 flows through a main magnetic flux path consisting of the excitation path pole 68, the cylindrical magnetic core 64, the magnetic salient poles 72, the cylindrical magnetic yoke 15, and the excitation path pole 6a. And the first magnet element 65, the second magnet element 66 are connected to the main magnetic flux path in parallel.

Permanent magnets 73, 75 magnetizes the island-shaped magnetic poles 71 and the magnetic salient poles 72 respectively in N pole and S pole, so magnetization of the magnet element which magnetizes the magnetic salient poles 72 in S pole is the first magnetization, and magnetization in an opposite direction will be the second magnetization. The first magnet element 65 is equivalent to the first magnetization and the second magnet element 66 is equivalent to the second magnetization respectively in the magnetization state indicated in FIG. 6, and a closed magnetic circuit is composed of those at the magnetic excitation part, and the magnetic flux is not supplied to outside.

Magnetic field strength for magnetization change in the first magnet element 65 is set to H1, and thickness thereof is set to L1, magnetic field strength for magnetization change in the second magnet element 66 is set to H2, and thickness thereof is set to L2, and the relation of those parameters is set as follows. That is, L1 is set to be smaller than L2, and H1*L1 is set to be larger than H2*(L1+L2).

The product of the excitation current peak supplied to the excitation coil 67 and the number of coil windings is set to AT, and AT to change magnetization of each magnet element is set up as follows. AT to change magnetization of the first magnet element 65 is set to be larger than H1*L1, and AT to change magnetization of the second magnet element 66 is set as smaller than H1*L1 and larger than H2*(L1+L2). The polarity of the excitation current is set up according to the magnetization direction of the each magnet element.

Since the excitation coil 67 is arranged at a excitation path formed by the first magnet element 65 and the second magnet element 66 in series, almost equal magnetic field intensity is applied in the first magnet element 65 and the second magnet element 66. But since the magnetic field intensity to change each magnetization is different, the magnetization state thereof is controlled, respectively. Applying a neodymium magnet (NdFeB) to the first magnet element 65, applying an Alnico magnet (AlNiCo) to the second magnet element 66, respectively, and the magnet element is constituted so as to meet above criteria.

In the above-mentioned composition, on the occasion of magnetization change of the first magnet element 65, the second magnet element 66 is always promptly magnetized according to the direction of excitation flux induced by the excitation coil 67, therefor magnetic resistance to the excitation flux is small. On the occasion of magnetization change of the second magnet element 66, when the direction of the excitation flux is the same as the magnetization direction of the first magnet element 65, the magnetic resistance to the excitation flux is small in nature. When the direction of the excitation flux is the opposite as the magnetization direction of the first magnet element 65, the length L1 is small, so the magnetic resistance of excitation path which regarded the first magnet element 65 as an air gap is small.

Therefore, although the first magnet element 65 and the second magnet element 66 become a part of other excitation path each other on the occasion of magnetization change of the first magnet element 65 or the second magnet element 66, since the magnetic resistance to the excitation flux is effectually small, magnetization change thereof is easy. Furthermore, the cylindrical magnetic core 64 consists of soft iron block so that alternating flux may be hard to flow through, and since the magnetic resistance to the alternating flux of the main flux path is large, the pulse-like excitation flux induced by the excitation coil 67 cannot flow through the main flux path easily.

Arrangement of the neodymium magnet (NdFeB) which will not cause irreversible demagnetization easily on the rotor surface facing the armature is desirable, but magnetic flux induced by the armature coils will not reach the magnetic excitation part easily as mentioned above, so easily magnetization changeable magnet can be applied as the magnet element. Magnetic field intensity required for magnetization change of neodymium magnet (NdFeB) is 2400 kA/m (kilo ampere/meter) grade, and magnetic field intensity required for magnetization change of Alnico magnet (AlNiCo) is about 240 kA/m. In this embodiment, since the excitation flux is induced in the circuit where the first magnet element 65 and the second magnet element 66 are connected in series, each magnet element needs to have different coercivity. Each magnet element is composed of magnet with different material, and magnetization easiness of each field magnet is adjusted by product of coercivity and thickness.

In the rotating electric machine of this embodiment, magnetic flux induced by the armature coils 62 mainly flows through around the magnetic salient poles 72, the island-shaped magnetic poles 71, the magnetic teeth 61, and the cylindrical magnetic yoke 15, there is little possibility to have influence on magnetization state of the first magnet element 65 and the second magnet element 66. Applying magnet material with low coercivity, or small thickness to the field magnets is possible.

The step to change magnetization state of the first magnet element 65 and the second magnet element 66 will be explained with FIGS. 9A, 9B, 9C. Both the first magnet element 65 and the second magnet element 66 are the first magnetization in FIG. 9A. The excitation current with enough amplitude and polarity to magnetize the first magnet element 65 to the first magnetization is supplied to the excitation coil 67. At this time, since the second magnet element 66 will be magnetized to the second magnetization, the excitation current with enough amplitude and polarity to magnetize only the second magnet element 66 to the first magnetization is further supplied to the excitation coil 67. Flux amount flowing to the armature side in this state is increased from only permanent magnets 73, 75.

In FIG. 9A, the excitation current with the amplitude and the polarity to magnetize only the second magnet element 66 to the second magnetization is supplied to the excitation coil 67, and the magnetization state is shown in FIG. 9B. In this state, flux coming from the first magnet element 65 and flux coming from the second magnet element 66 offset each other, and are not supplied to the armature, then flux crossing the armature coils assumed to be only the flux coming from the permanent magnets 73 and 75.

In FIG. 9A, the excitation current with the amplitude and the polarity to magnetize the first magnet element 65 to the second magnetization is supplied to the excitation coil 67. At this time, since the second magnet element 66 will be magnetized to the first magnetization, the excitation current with the amplitude and the polarity to magnetize only the second magnet element 66 to the second magnetization is further supplied to the excitation coil 67, and the magnetization state is shown in FIG. 9C. The flux amount flowing to the armature side in this state is decreased from the case of only permanent magnets 73, 75.

The conductor layer 69 consists of a copper plate around the rotational shaft 11, and makes induced flux by the excitation coil 67 concentrate on the excitation path, and makes inductance of the excitation coil 67 decrease in the effect so that the pulse-like excitation current is made easy to flow. When the pulse-like excitation electric current is supplied to the excitation coil 67, an electric current in the direction which bars magnetic flux change will be induced in the conductor layer 69, makes flux amount by the excitation coil 67 decreases within conductor layer 69, and makes the magnetic flux concentrate on the excitation path. The excitation path poles 6a and 68 are composed of powder magnetic core with large resistivity. Besides, bulk-like magnetic substance with big specific resistance can also be used for them.

Thus, changing the excitation current supplied to the excitation coil 67, and changing the number of magnet elements corresponding to the first magnetization and the second magnetization, flux amount through the armature is controlled. Relationship between the flux amount and the excitation current is set as map data in design phase. However, in mass-production stage of rotating electric machines, precise control of flux amount through the armature may become difficult in presence of variation in component dimension and magnetic property. In such case, the above-mentioned relationship is inspected after assembly of the rotating electric machine, and the above-mentioned map data is corrected. Furthermore, magnetic substance tends to receive influence by temperature, and when there is also anxious about aging changes, information to correct the above-mentioned map data can be studied by supervising the relationship between the excitation current and the magnetization state during operation of the rotating electric machine. It is difficult to grasp flux amount through the armature directly, but the flux amount is estimated by referring to generated voltage of the armature coils 62.

Although magnetization state of the first magnet element 65 and the second magnet element 66 is discrete, further in this embodiment, the flux adjustment current of a degree which does not make the magnet elements cause irreversible magnetization change is supplied to the excitation coil 67 in each magnetization state of the magnet elements, and induced flux is superimposed on flux coming from the first magnet element 65, the second magnet element 66 and permanent magnets 73, 75, and flux amount through the armature is controlled. Polarity of the flux adjustment current is changed according to direction to increase or decrease the flux amount.

The flux by the flux adjustment current is caused in closed magnetic flux path including the first magnet element 65 and the second magnet element 66 together, and in closed magnetic flux path including the first magnet element 65 and the main magnetic flux path. Thickness L1 of the first magnet element 65 is set as smaller than thickness L2 of the second magnet element 66, and further magnetic resistance assuming the second magnet element 66 as air gap is set as larger than magnetic resistance of the main magnetic flux path so that most magnetic flux by the flux adjustment current may flow into the main magnetic flux path. The magnetic resistance of the main magnetic flux path fluctuates according to relative position between the magnetic salient poles and the magnetic teeth, and therefore, the averaged magnetic resistance thereof is set to be approximately equal to the magnetic resistance of the main magnetic flux path.

As described above, in the rotating electric machine apparatus shown in FIGS. 6 to 9, it has been explained that by changing magnetization state of the first magnet element 65 and the second magnet element 66, magnetic flux flowing in the armature can be controlled. This embodiment is system for optimizing output by controlling the flux amount, and control method as the rotating electric machine system will be explained by using FIG. 5.

A rotating electric machine system in which the rotating electric machine apparatus serves as an electric motor and by which flux amount control is performed to optimize rotational force control will be explained. The flux adjustment current to increase flux amount flowing through the armature is assumed as positive in the explanation. When the rotational speed that is the output 53 becomes larger than a predetermined value and flux amount flowing through the armature is made to be smaller, the flux adjustment current being supplied to the excitation coil 67 from the flux adjustment circuitry 59 is decreased. When the flux adjustment current is smaller than a predetermined value in the case, excitation current to increase number of magnet element in the second magnetization is supplied to the excitation coil 67 from the magnetization control circuitry 5*a*, and number of magnet element in the first magnetization is decreased as well as number of magnet element in the second magnetization is increased, and flux amount flowing through the armature is made smaller.

When the rotational speed that is the output 53 becomes smaller than a predetermined value and flux amount flowing through the armature is made to be larger, the flux adjustment current being supplied to the excitation coil 67 from the flux adjustment circuitry 59 is increased. When the flux adjustment current is larger than a predetermined value in the case, excitation current to increase number of magnet element in the first magnetization is supplied to the excitation coil 67 from the magnetization control circuitry 5*a*, and the number of magnet element in the second magnetization is decreased as well as the number of magnet element in the first magnetization is increased, and the flux amount flowing through the armature is made larger.

A constant-voltage power generation system in which the rotating electric machine apparatus serves as an electric generator and by which the flux amount control is performed to control the power generation voltage to be a predetermined voltage will be explained.

When the power generation voltage that is the output 53 becomes larger than a predetermined value and flux amount flowing through the armature is made to be smaller, the flux adjustment current being supplied to the excitation coil 67 from the flux adjustment circuitry 59 is decreased. When the flux adjustment current is smaller than a predetermined value in the case, excitation current to increase number of magnet element in the second magnetization is supplied to the excitation coil 67 from the magnetization control circuitry 5*a*, and number of magnet element in the first magnetization is decreased as well as number of magnet element in the second magnetization is increased, and the flux amount flowing through the armature is made smaller.

When the power generation voltage that is the output 53 becomes smaller than a predetermined value and flux amount flowing through the armature is made to be larger, the flux adjustment current being supplied to the excitation coil 67 from the flux adjustment circuitry 59 is increased. When the flux adjustment current is larger than a predetermined value in the case, excitation current to increase number of magnet element in the first magnetization is supplied to the excitation coil 67 from the magnetization control circuitry 5*a*, and number of magnet element in the second magnetization is decreased as well as number of magnet element in the first magnetization is increased, and the flux amount flowing through the armature is made larger.

In this embodiment, the island-shaped magnetic poles 71 and the magnetic salient poles 72 are magnetized by permanent magnets 73 and 75 in different polarity each other, and the island-shaped magnetic poles 71 are constituted so that magnetic flux coming from the magnetic excitation part may be hard to flow through by the non-magnetic members 74. It is possible to use the reluctance torque and as well as the magnet torque due to this configuration. Disposing permanent magnets instead of the non-magnetic members 74, the island-shaped magnetic poles 71 and the magnetic salient poles 72 can be configured to be more strongly magnetized.

Moreover, the magnetic excitation part arranged at both ends of the rotor is quite the same composition, and either magnetic excitation part magnetizes the magnetic salient poles 72 in the same direction in this embodiment. The purpose is to supply sufficient flux amount in a long rotating electric machine, and only single magnetic excitation part is enough in case of a short rotating electric machine. The armature coils 62 are described as a concentration winding, a distribution winding can be applied in the course.

The rotating electric machine system according to a third embodiment of the present invention will be explained by using FIGS. 10 to 12. The third embodiment is a rotating electric machine system that a magnetic excitation part does not have a field magnet and controls flux amount flowing through an armature by an electric current.

Figure 10:
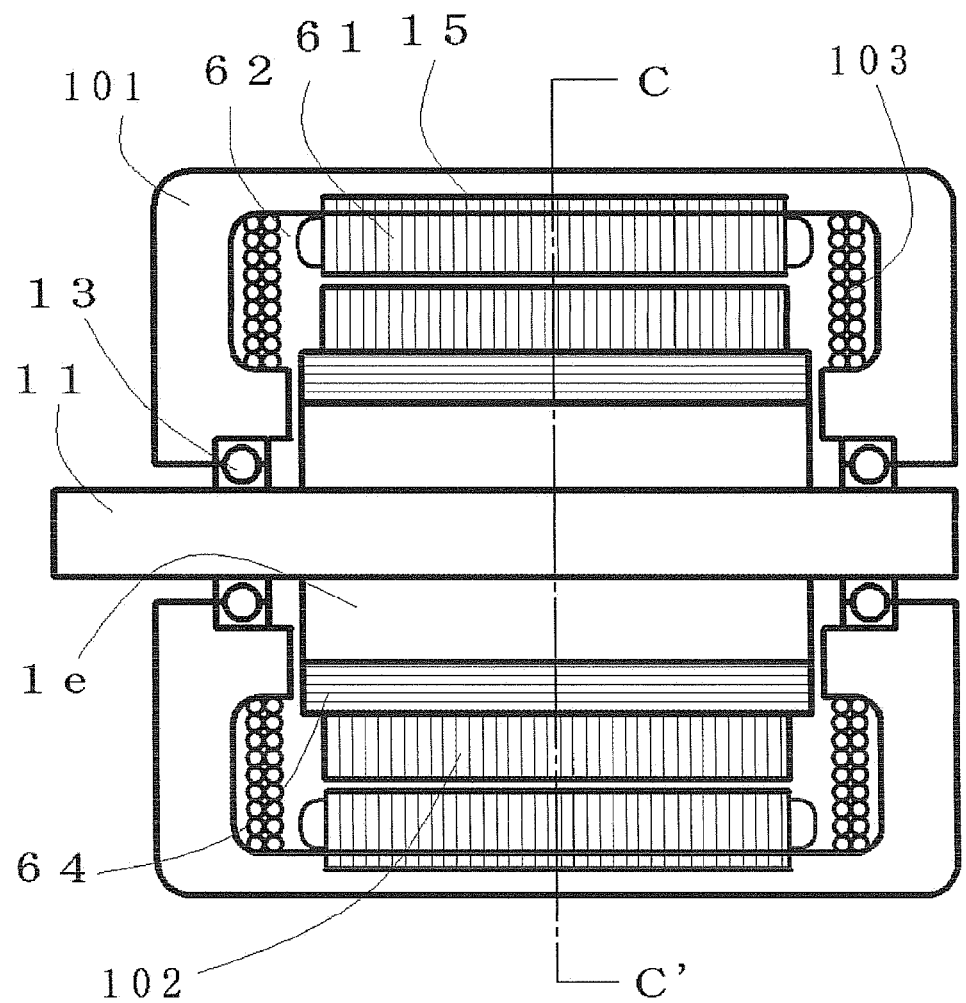
FIG. 10 is a longitudinal sectional view of a rotating electric machine apparatus according to a third embodiment of the present invention.

FIG. 10 shows a longitudinal sectional view of the embodiment in which the present invention is applied to a rotating electric machine apparatus having a radial gap structure, and the rotational shaft 11 is supported rotatably by a housing 101 through bearings 13. An armature includes the cylindrical magnetic yoke 15 fixed to the housing 101, the magnetic teeth 61, and the armature coils 62. A rotor includes a surface magnetic pole part 102, the cylindrical magnetic core 64, and may rotate with the rotational shaft 11. The surface magnetic pole part 102 has island-shaped magnetic poles embedded in a cylindrical magnetic substrate and magnetic salient poles that are a part of the cylindrical magnetic substrate alternately in circumferential direction. A magnetic excitation part consists of excitation coils 103 arranged at the housing side of the rotor both ends, the cylindrical magnetic core 64, and the housing 101. In this embodiment, the housing 101 consists of magnetic material mainly composed of iron, and the magnetic flux is passed between the cylindrical magnetic substrate and the cylindrical magnetic yoke 15 by the current supplied to excitation coils 103, and flux amount through the armature coils 62 is controlled.

Figure 11:
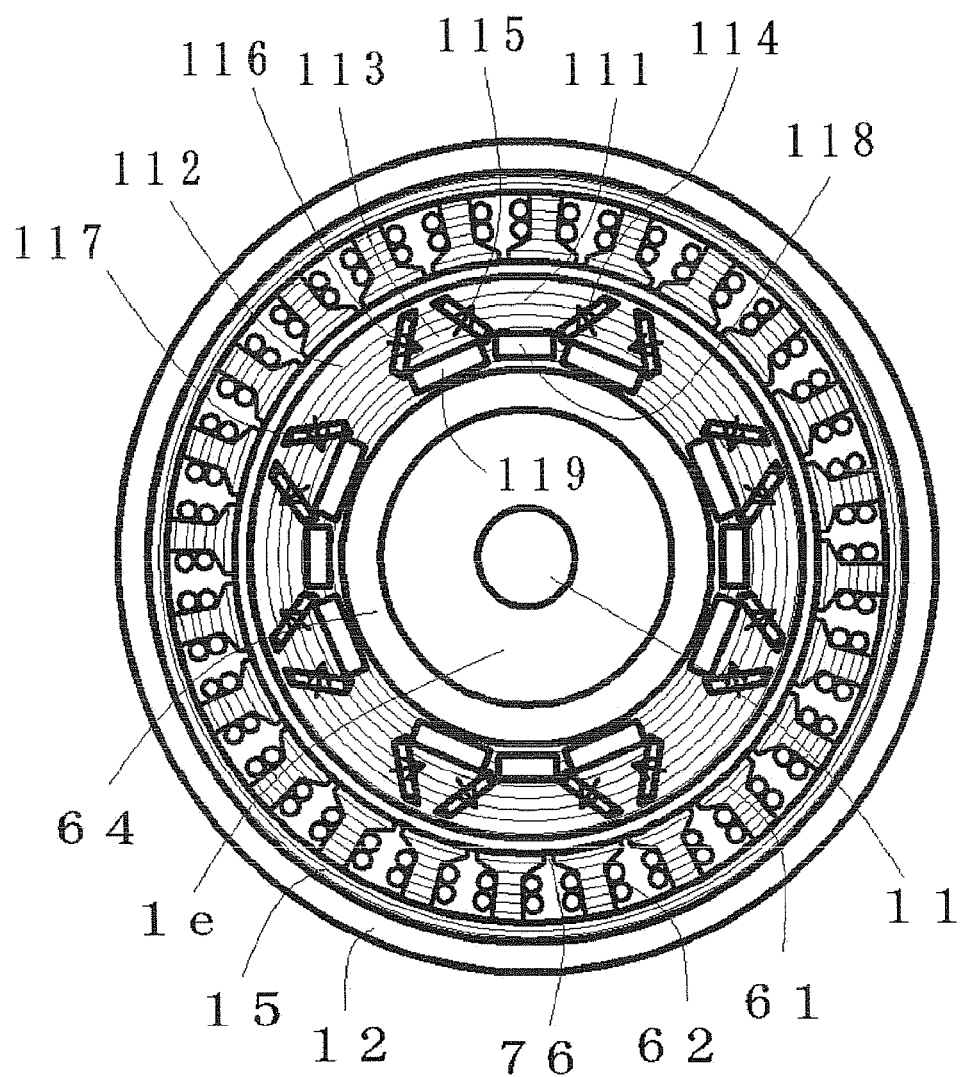
FIG. 11 is a sectional view showing an armature and a rotor of the rotating electric machine apparatus shown in FIG. 10.

FIG. 11 illustrates a sectional view of the armature and the rotor along C-C' of FIG. 10, and some of component parts are appended with numbers for explaining the reciprocal relation. Since an armature composition is the same as the armature composition of the second embodiment, explanation is omitted. The surface magnetic pole part 102 has composition that the cylindrical magnetic substrate is sectioned by permanent magnet assemblies in a circumferential direction. A combination of an intermediate magnetic salient pole 113 and permanent magnet plates 115, 116 having same magnetization direction disposed at both sides of the intermediate magnetic salient pole 113 serves as the permanent magnet assembly. The surface magnetic pole part 102 is characterized in that a uniform magnetic material is partitioned into the island-shaped magnetic poles 111, the magnetic salient poles 112 by the permanent magnet assemblies in the circumferential direction. And each magnetization direction of the adjacent permanent magnet assemblies is inversely arranged so that the island-shaped magnetic poles 111, the magnetic salient poles 112 are magnetized in different polarities each other. The disposition shape of the permanent magnet plates 115, 116 that are disposed at the side surface of the island-shaped magnetic poles 111, the magnetic salient poles 112 looks like V-letter, a crossing angle of the V-letter shape is arranged at a suitable value for a flux barrier. Arrows appended in the permanent magnet plates 114, 115, 116, 117 show magnetization directions that are perpendicular to the permanent magnet plates 114, 115, 116, 117 face.

Non-magnetic members 118 are arranged on an inner side of the island-shaped magnetic poles 111 as isolation members, and the island-shaped magnetic poles 111 are isolated magnetically from the magnetic salient poles 112 by the non-magnetic members 118 and permanent magnet plates 114, 115. Although permanent magnet plates 116, 117 are arranged at both sides of the magnetic salient poles 112, all the magnetic salient poles 112 are connected through the inner circumference portion. The isolation members are not arranged within the magnetic salient poles. The island-shaped magnetic poles 111 and the magnetic salient poles 112 are magnetized to an N pole and an S pole respectively by permanent magnet plates 114, 115, 116, 117. Further, non-magnetic members 119 are arranged so that magnetic flux coming from the magnetic excitation part should not pass over the magnet assembly.

Figure 12:
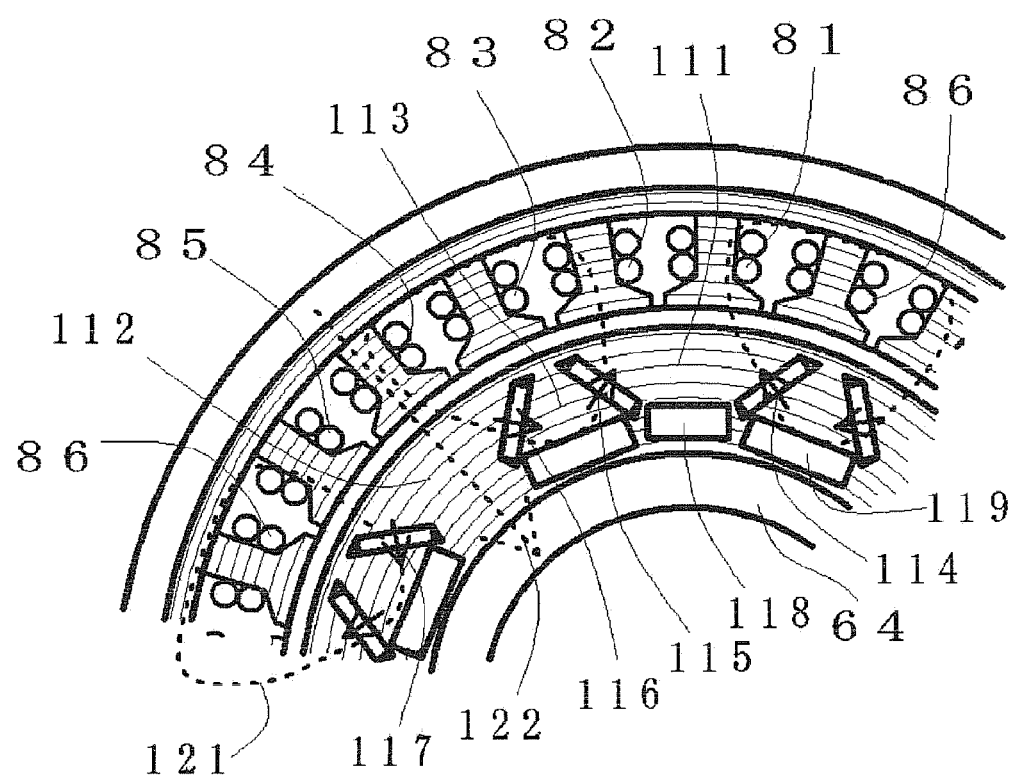
FIG. 12 is showing magnetic flux flow and a magnified sectional view an armature and a surface magnetic pole part shown in FIG. 11.

FIG. 12 is showing magnetic flux flow and a magnified sectional view of the armature and the surface magnetic pole part 102 of the rotor shown in FIG. 11, the flow of the magnetic flux coming from the permanent magnets 114, 115, 116, 117, and the magnetic excitation part is shown. FIG. 12 indicates the case where the magnetic excitation part increases flux amount crossing the armature coils 62 more than the cases of permanent magnets 114, 115, 116, 117 only.

As FIG. 8, armature coils of the first armature magnetic pole group are shown as armature coils 81, 82, and 83 in the armature coils of U-phase, V-phase, and W-phase, respectively. Armature coils of the second armature magnetic pole group are shown as armature coils 84, 85, and 86 in the armature coils of U'-phase, V'-phase, and W'-phase, respectively. Armature coils of two groups are configured so that when U phase armature coil 81 faces the island-shaped magnetic pole 111, U'-phase armature coil 84 may face the magnetic salient pole 112. U-phase armature coil 81 and U'-phase armature coil 84 are connected in series to generate magnetic flux in the opposite direction when current is flowed. V-phase armature coil 82 and V'-phase armature coil 85, W-phase armature coil 83 and W'-phase armature coil 86 are similarly connected respectively, and all of armature coils are wired to 3 phase as a whole.

Dotted lines 121 represent magnetic flux coming from the permanent magnets 114, 115, 116, 117. The direction of the magnetic flux 121 crossing U-phase armature coil 81 is opposite to the magnetic flux 121 crossing U'-phase armature coil 84 each other, the direction of the magnetic flux 121 crossing V-phase armature coil 82 is opposite to the magnetic flux 121 crossing V'-phase armature coil 85 each other, the direction of the magnetic flux 121 crossing W-phase armature coil 83 is opposite to the magnetic flux 121 crossing w'-phase armature coil 86 each other. Therefore, the generation voltage by the magnetic flux 121 coming from permanent magnets 114, 115, 116, 117 is correctly synthesized as three-phase induced voltage, voltage output waveform of three phase is not influenced even if there is unbalance between the flux amounts flowing through the island-shaped magnetic poles 111 and the magnetic salient poles 112 which are adjacent salient poles.

In FIG. 12, the flux coming from the magnetic excitation part is indicated by number 122, is obstructed by the non-magnetic members 118, does not flow through the island-shaped magnetic poles 111 and flows radially through the magnetic salient poles 112 solely. When direction of the magnetic flux 122 is assumed same as the direction where magnetic flux 121 flows through the magnetic salient poles 112, the magnetic flux 122 and 121 crossing W-phase armature coil 83, U'-phase armature coil 84, and V'-phase armature coil 85 in the same direction. Therefore, the magnetic excitation part increases flux amount crossing the armature coils more than the case of only permanent magnets 114, 115, 116, 117. When the direction of the magnetic flux 122 is made into an opposite direction in FIG. 12, the magnetic excitation part decreases flux amount crossing the armature coils more than the case of only permanent magnets 114, 115, 116, 117.

The excitation coil 103 is disposed around the rotational shaft 11 on the inner side of the housing 101, and both ends of the cylindrical magnetic core 64 face the housing 101 through a minute gap. Thus the magnetic excitation part is constituted so that excitation coils 103 induce magnetic flux in magnetic path constituted by the cylindrical magnetic core 64, the magnetic salient poles 112, the magnetic teeth 61, and the cylindrical magnetic yoke 15. The flux amount crossing the armature coils 62 (81, 82, 83, 84, 85, 86) can be controlled by changing the supplied current into the excitation coils 103 as explained by using FIG. 12.

In this embodiment, three flux paths exist in radial direction, and they are connected in parallel. The first flux path is constituted by the cylindrical magnetic core 64, the island-shaped magnetic poles 111, the magnetic teeth 61, and the cylindrical magnetic yoke 15. The second flux path is constituted by the cylindrical magnetic core 64, the magnetic salient poles 112, the magnetic teeth 14, and the cylindrical magnetic yoke 15. And the third flux path is constituted by the cylindrical magnetic core 64, the housing 101, and the cylindrical magnetic yoke 15. Although, almost flux coming from permanent magnets 114, 115, 116, 117 flows in small flux path through the island-shaped magnetic poles 111, the magnetic salient poles 112, the magnetic teeth 14, and the cylindrical magnetic yoke 15, as shown in FIG. 12, a part of the flux may flow through the third flux path. The magnetic resistance of the third flux path is arranged larger than that of the second flux path by setting area size and gap length between the housing 101 and the cylindrical magnetic core 64.

The rotating electric machine system according to a fourth embodiment of the present invention will be explained by using FIGS. 13 to 17. The fourth embodiment is a rotating electric machine system that permanent magnets are disposed in island-shaped magnetic poles, magnetization state thereof will be changed by an electric current supplied to armature coils, control range of magnetic flux amount crossing armature coils will be enlarged. That is, the permanent magnets arranged in the island-shaped magnetic poles are isolation members as well as sub-field magnets of which magnetization can be changed.

Figure 13:
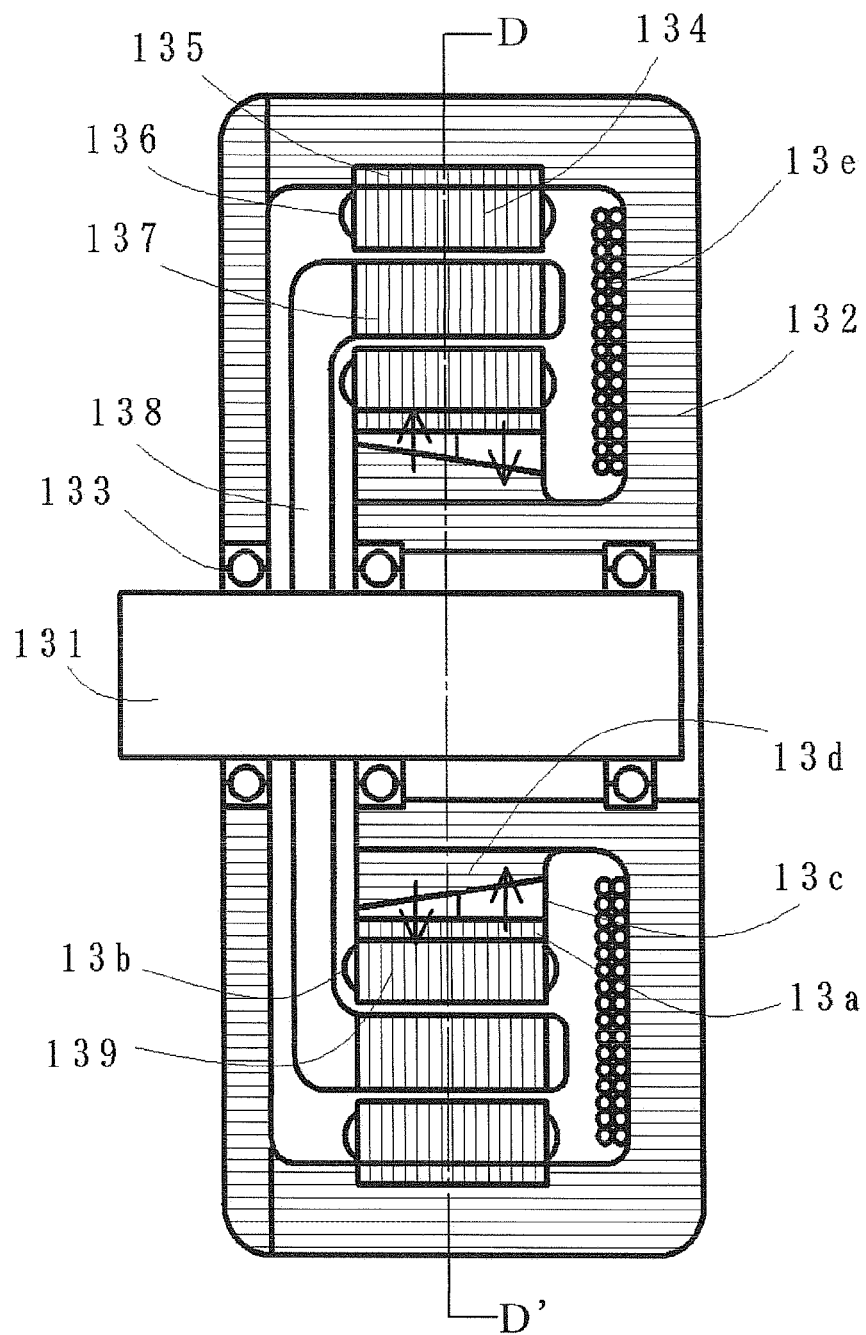
FIG. 13 is a longitudinal sectional view of a rotating electric machine apparatus according to a fourth embodiment of the present invention.

FIG. 13 shows a longitudinal sectional view of the embodiment in which the present invention is applied to a rotating electric machine apparatus having an radial gap structure, two stators. An armature has a first armature disposed at outer radius side and a second armature disposed at inner radius side. The first armature includes magnetic teeth 134, a cylindrical magnetic yoke 135, and armature coils 136, the second armature includes magnetic teeth 139, a cylindrical magnetic yoke 13a, and armature coils 13b. A rotor has a surface magnetic pole part 137, and the surface magnetic pole part 137 faces the first armature at outer side thereof, and faces the second armature at inner side thereof. Number 138 indicates a rotor support.

A principal part of a magnetic excitation part consists of a housing 132 made of magnetic material, a field magnet 13c having successively changing radial thickness between a magnetic core 13d leading to the housing 132 and the cylindrical magnetic yoke 13a, and an excitation coil 13e. The excitation coil 13e is arranged so that a magnetic flux may be generated in magnetic flux path consisting of the housing 132, the cylindrical magnetic yoke 135, the magnetic teeth 134, the surface magnetic pole part 137, the magnetic teeth 139, the cylindrical magnetic yoke 13a, the field magnet 13c, and the magnetic core 13d. Arrows in the field magnet 13c indicate magnetization direction, magnetization region having an outer diameter and an inside diameter direction exists.

Figure 14:
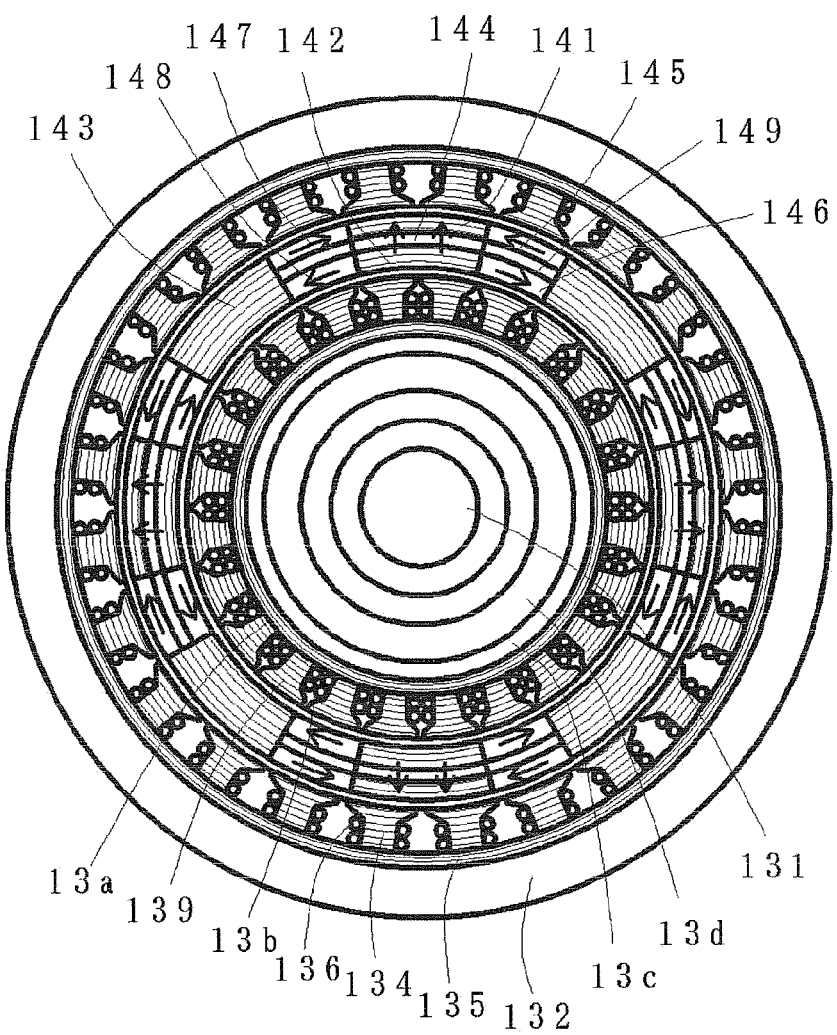
FIG. 14 is a sectional view showing an armature and a rotor of the rotating electric machine apparatus shown in FIG. 13.

FIG. 14 illustrates a sectional view of the armature and the rotor along D-D' of FIG. 13, and some of component parts are appended with numbers for explaining the reciprocal relation. In both inner and outer sides of the surface magnetic pole part 137 of the rotor, island-shaped magnetic poles 141, 142, and magnetic salient poles 143 are formed by the permanent magnet arranged at equal intervals mostly in circumferential direction into a cylindrical magnetic substrate. Furthermore, adjacent permanent magnets magnetization is reversed each other. The sub-field magnets 144 are disposed between the island-shaped magnetic poles 141 and 142, non-magnetic members 149 are arranged between permanent magnets 145 and 146, and between permanent magnets 147 and 148.

The sub-field magnets 144 have the outward magnetization in radius, magnetizes the island-shaped magnetic poles 141 with permanent magnets 145, 147 in outward direction, and, in addition, the sub-field magnets 144 and permanent magnets 146, 148 magnetize the island-shaped magnetic poles 142 in outward direction. The magnetic salient poles 143 are magnetized in inward direction by permanent magnets 145, 146, 147, 148. The sub-field magnets 144 arranged between the island-shaped magnetic poles 141 and 142 are the isolation members to make a magnetic flux coming from the magnetic excitation part be hard to pass through as well as permanent magnets of which magnetization can be changed. Arrows in permanent magnets 145, 146, 147, 148, and the sub-field magnets 144 indicate magnetization direction.

The first armature is composed of the cylindrical magnetic yoke 135 fixed to the housing 132, a plurality of magnetic teeth 134 extending radially from the cylindrical magnetic yoke 135 and having non-magnetic portions in the circumferential direction, and the armature coils 136 wound around the magnetic teeth 134. The second armature is composed of the cylindrical magnetic yoke 13a, a plurality of magnetic teeth 139 extending radially from the cylindrical magnetic yoke 13a and having non-magnetic portions in the circumferential direction, and the armature coils 13b wound around the magnetic teeth 139.

In the first armature and the second armature, the armature coils and the magnetic teeth belonging to each of the first armature magnetic pole group and the second armature magnetic pole group are arranged in different positions in circumferential direction. Armature coils of U-phase, V-phase, W-phase, U'-phase, V'-phase, and W'-phase are arranged repeatedly in circumferential direction, 24 armature coils are arranged to eight magnetic poles of the rotor. Armature coils of U phase, V-phase, and W-phase belong to the first armature magnetic pole group, and armature coils of U'-phase, V'-phase, and W'-phase belong to the second armature magnetic pole group. U-phase and U'-phase indicate same phase, V-phase and V'-phase indicate same phase, W-phase and W'-phase indicate same phase, respectively.

Figure 15:
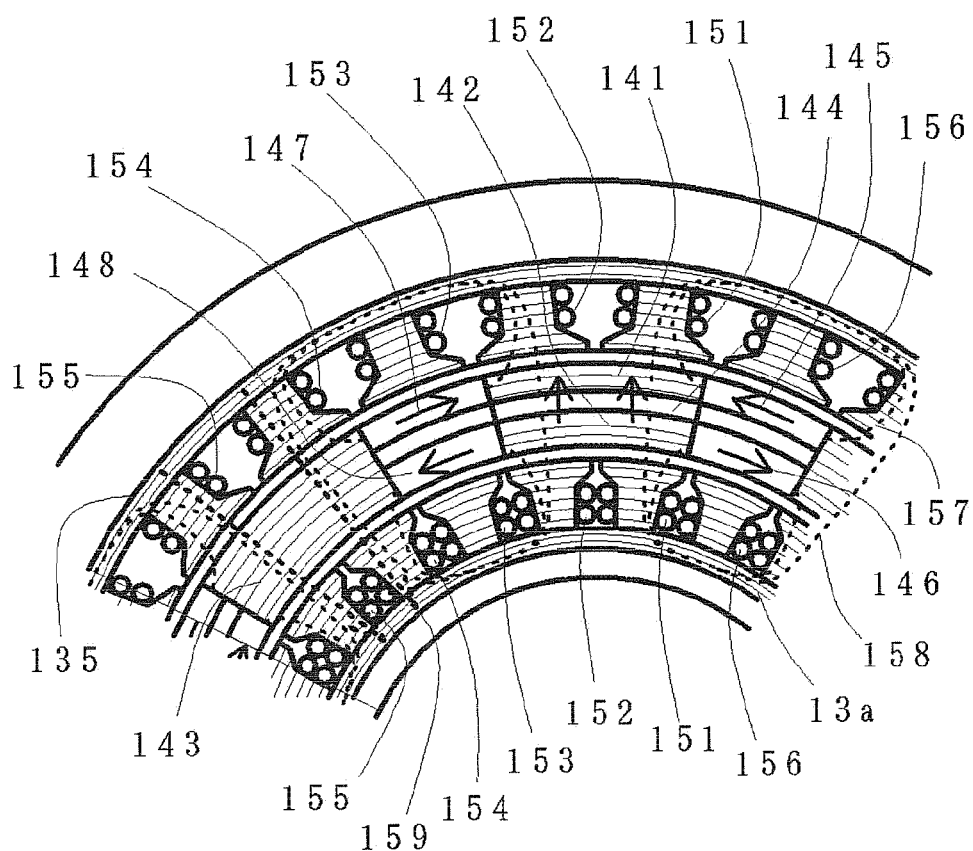
FIG. 15 is showing magnetic flux flow and a magnified sectional view showing an armature and the rotor shown in FIG. 14.

FIG. 15 is showing magnetic flux flow and a magnified sectional view of the first armature and the rotor and the second armature. Magnetic flux flow coming from the magnetic excitation part, composition of the rotor will be explained referring the figure. The first surface magnetic pole part and the second surface magnetic pole part of the rotor are formed by dividing a uniform cylindrical magnetic substrate by permanent magnets with circumferential direction magnetization, and have the island-shaped magnetic poles and the magnetic salient poles alternately in circumferential direction. The sub-field magnets 144 are disposed between the island-shaped magnetic poles 141, 142 located radially in a line.

Armature coils 136 of the first armature are shown as armature coils 151, 152, 153, 154, 155, and 156 in the armature coil of U-phase, V-phase, W-phase, U'-phase, V'-phase, and W'-phase, respectively. The armature coils 13b of the second armature is also the same composition, and the respectively same numbers are given to the armature coil of each phase. Armature coils of two armature magnetic pole groups are configured so that when U phase armature coil 151 faces the island-shaped magnetic pole 141(142), U'-phase armature coil 154 may face the magnetic salient pole 143. U-phase armature coil 151 and U'-phase armature coil 154 are connected in series to generate magnetic flux in opposite direction each other when current flows. V-phase armature coil 152 and V'-phase armature coil 155, W-phase armature coil 153 and W'-phase armature coil 156 are similarly connected respectively, and all of armature coils are wired to 3 phase as a whole.

Permeability of permanent magnets is close to an air gap, magnetic flux amount coming from the permanent magnet is fixed mostly, so the permanent magnet with big thickness can be applied as the isolation member of bi-directional magnetic flux. Flux coming from the magnetic excitation part is obstructed by the sub-field magnets 144, does not flow through the island-shaped magnetic poles 141 and 142, and flows through the magnetic salient poles 143 solely.

Dotted lines 157 represent magnetic flux coming from the permanent magnets 145, 146, 147, 148, and dotted lines 158 represent magnetic flux coming from the sub-field magnets 144. The direction of the magnetic flux 157 and 158 crossing U-phase armature coil 151 is opposite to the magnetic flux 157 and 158 crossing U'-phase armature coil 154 each other, the direction of the magnetic flux 157 and 158 crossing V-phase armature coil 152 is opposite to the magnetic flux 157 and 158 crossing V'-phase armature coil 155 each other, the direction of the magnetic flux 157 and 158 crossing W-phase armature coil 153 is opposite to the magnetic flux 157 and 158 crossing w'-phase armature coil 156 each other. Therefore, the generation voltage by the magnetic flux 157 and 158 is correctly synthesized as three-phase induced voltage, voltage output waveform of three phase is not influenced even if there is unbalance between the flux amounts flowing through the island-shaped magnetic poles and the magnetic salient poles which are adjacent salient poles.

In FIG. 15, flux coming from the magnetic excitation part is indicated by number 159, is obstructed by the sub-field magnets 144, does not flow through the island-shaped magnetic poles 141, 142, and flows radially through the magnetic salient poles 143 solely. When the direction of the magnetic flux 159 is assumed as direction from the cylindrical magnetic yoke 135 to the cylindrical magnetic core 13a, directions of the magnetic flux 157, 158, and 159 crossing U'-phase armature coil 154, and V'-phase armature coil 155 are the same. Therefore, the magnetic excitation part increases flux amount crossing the armature coils more than the case of only permanent magnets 145, 146, 147, 148 and the sub-field magnet 144.

The magnetic flux 159 coming from the magnetic excitation part flows through the magnetic salient poles 143 solely in radial direction, and the generated voltage is not the same in each armature coil. However, armature coils of the first armature magnetic pole group and the second armature magnetic pole group are placed at different circumferential position as described above, in armature coils belonging to the same phase that drive current is supplied at the same time, when one faces the island-shaped magnetic pole, other is arranged to face the magnetic salient pole, and they are connected in series to produce a flux in the opposite direction each other when current is flowed. Therefore, drive torque fluctuations or a generation voltage waveform distortion is restrained.

Flux amount flowing out from the island-shaped magnetic poles is assumed as constant, flux amount flowing through the magnetic salient poles is assumed as variable, and then flux amount crossing the armature coils is controlled in other embodiment. In this embodiment, flux amount range crossing the armature coils is expanded further by changing magnetization state of the sub-field magnets 144.

Figure 16:
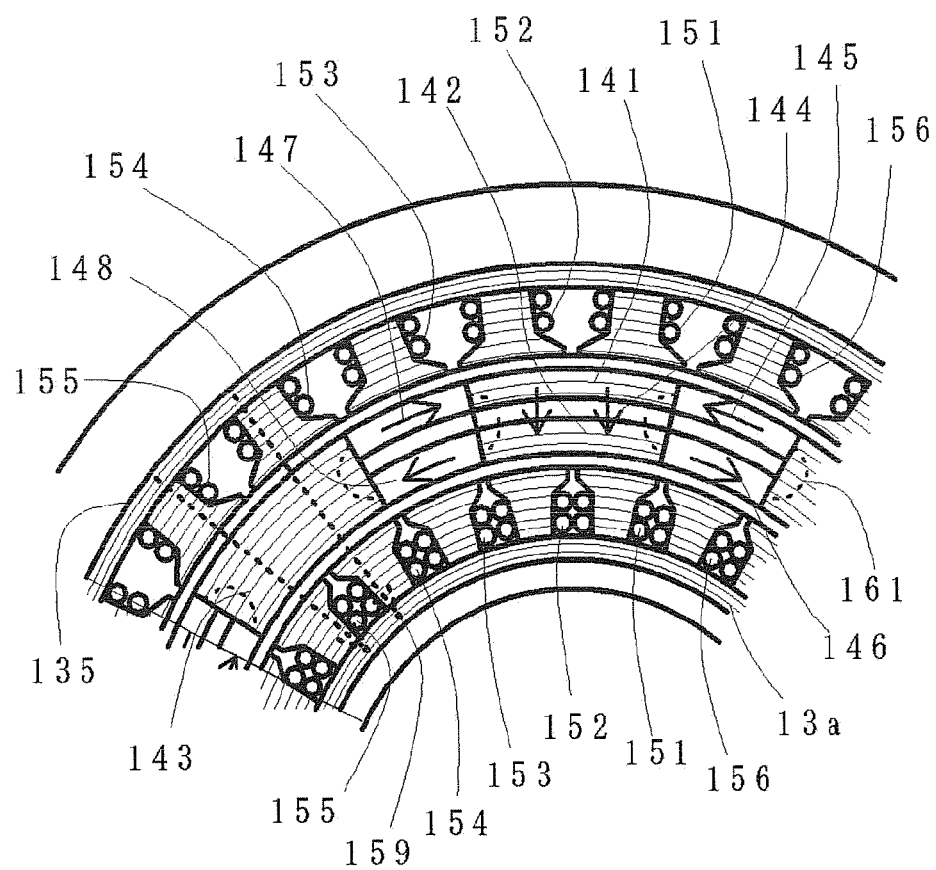
FIG. 16 is showing magnetic flux flow and a magnified sectional view showing an armature and the rotor shown in FIG. 14.

When the sub-field magnets 144 and permanent magnets 145, 146, 147, 148 magnetize island-shaped magnetic poles 141, 142 in same direction, the flux 157 and the flux 158 flow through armature coils in same direction. However, as indicated in FIG. 16, magnetization direction of the sub-field magnets 144 is reversed, magnetic flux coming from permanent magnets 145, 146, 147, 148 and magnetic flux coming from the sub-field magnets 144 constitute closed flux path within the rotor as shown by dotted lines 161, and magnetic flux amount leaking to the armature becomes small.

Figure 17:
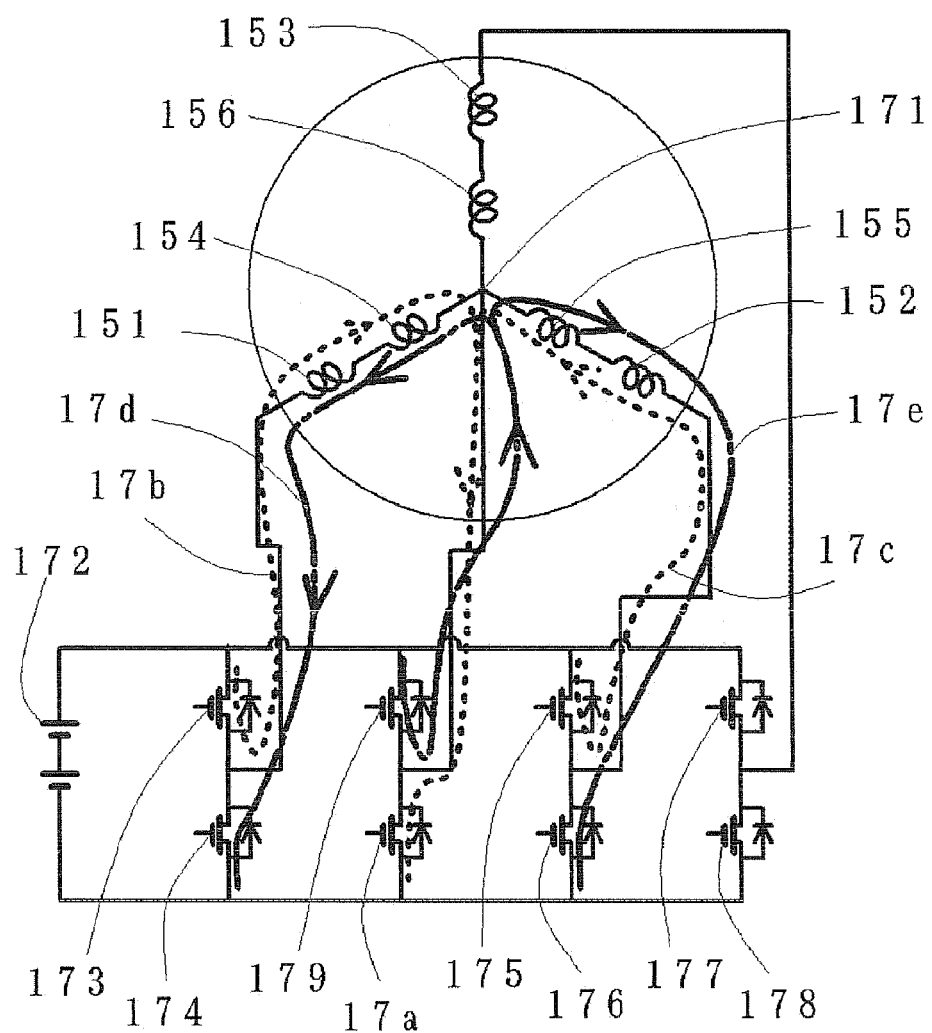
FIG. 17 is wire connection state of the armature coils shown in FIG. 15 and drive circuitry.

Operating principle of magnetization change in the sub-field magnets 144 will be explained by using FIGS. 15 and 17. FIG. 17 indicates simplified wiring diagram of armature coils 151-156 and a driving circuitry. The armature coil 151 and the armature coil 154 are connected in series to induce reverse direction magnetic flux each other, one end thereof is connected to a neutral point 171, and other end is connected to switch elements 173, 174. The armature coil 152 and the armature coil 155 are connected in series to induce reverse direction magnetic flux each other, one end thereof is connected to the neutral point 171, and other end is connected to switch elements 175, 176. The armature coil 153 and the armature coil 156 are connected in series to induce reverse direction magnetic flux each other, one end thereof is connected to the neutral point 171, and other end is connected to switch elements 177, 178. Furthermore, the neutral point 171 is connected to switch elements 179 and 17a. A number 172 shows a battery. The control unit which controls on-off of the above switch elements is not illustrated.

During normal operation of the rotating electric machines, switch elements 179 and 17a connected with the neutral point 171 are set to OFF, three phase drive current is supplied to each armature coil according to position of the rotor, and the rotor is driven to rotate. When magnetization state of sub-field magnets 144 is made to change, on-off control of the switch elements 179 and 17a is performed with the switch elements connected with the armature coils selected by the position sensor output of the rotor not shown in the figure, and the excitation current is supplied to the armature coils opposed to the island-shaped magnetic poles 141(142) to change.

When magnetic flux is induced to change magnetization state of the sub-field magnet 144 along dotted lines 158 in FIG. 15, switch elements 173, 175, and 17a are turned ON so that excitation current 17b flowing through armature coils 151, 154 and excitation current 17c flowing through armature coils 152, 155 may be supplied. When magnetization direction of the sub-field magnet 144 is made reverse, switch elements 174, 176, and 179 are turned ON so that excitation current 17d flowing through armature coils 151, 154 and excitation current 17e flowing through armature coils 152, 155 may be supplied.

As mentioned above, the rotating electric machine by this embodiment controls flux amount flowing through the armature by changing magnetization state of the field magnet and also the sub-field magnets. Although, flux amount and direction from the magnetic excitation part are controlled by changing magnetization state of the field magnet 13c, composition of the field magnet 13c is same composition as the first embodiment. Further explanation of flux amount control by the magnetic excitation part will be omitted.

The rotating electric machine system according to a fifth embodiment of the present invention will be explained by using FIG. 18. The fifth embodiment is a rotating electric machine system that a magnetic excitation part does not have a field magnet and controls flux amount flowing through an armature by an electric current.

Figure 18:
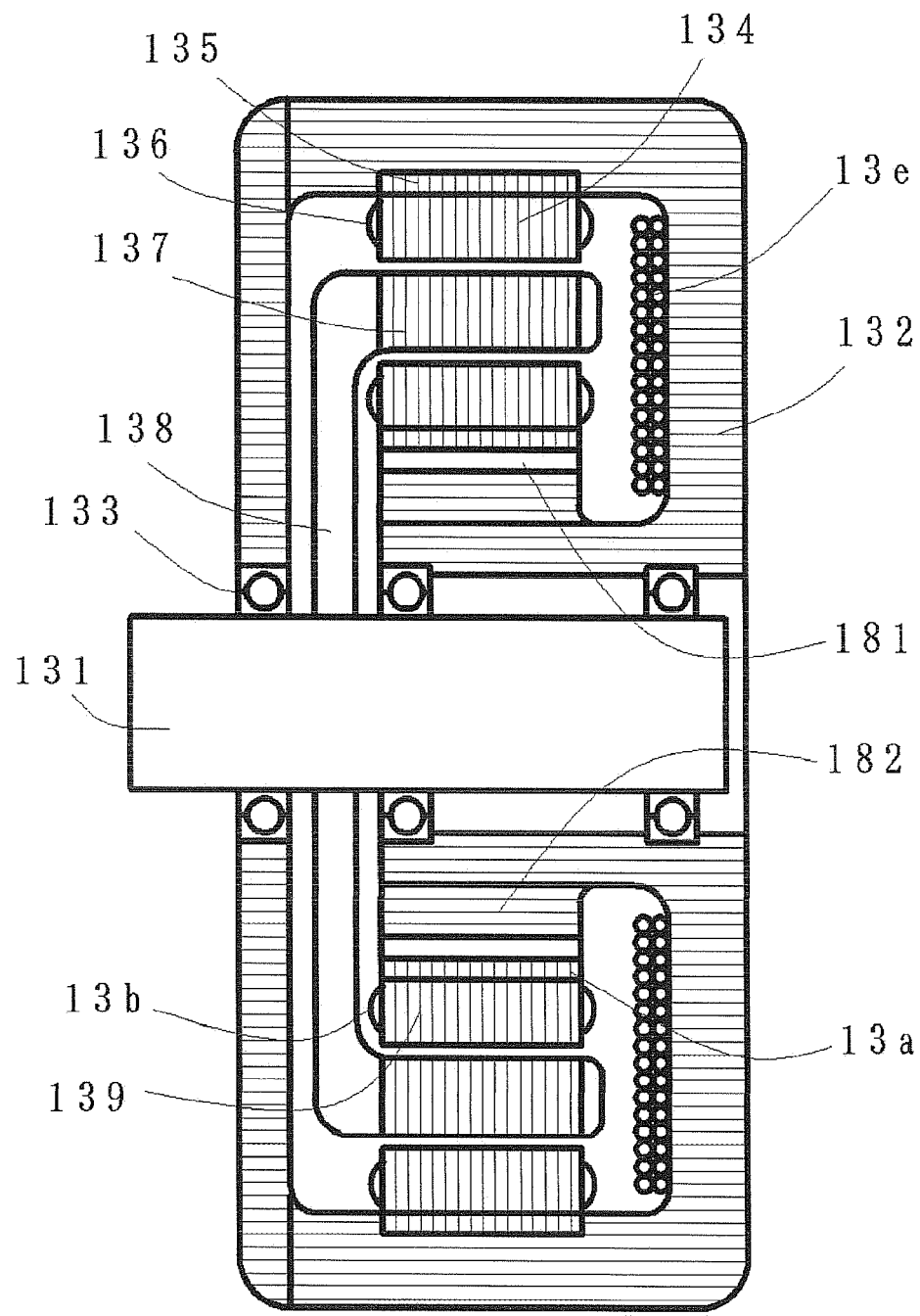
FIG. 18 is a longitudinal sectional view of a rotating electric machine apparatus according to a fifth embodiment of the present invention.

FIG. 18 shows a longitudinal sectional view of a rotating electric machine apparatus that the magnetic excitation part of the fourth embodiment is changed to electric current excitation. This embodiment is almost the same configuration as the fourth embodiment, the field magnet is removed from the composition shown in FIG. 13, and a cylindrical magnetic core 182 that is an excitation flux path member and a non-magnetic member 181 are arranged there. Magnetic flux induced by the excitation coil 13e flows along the housing 132, the cylindrical magnetic yoke 135, the magnetic teeth 134, the surface magnetic pole part 137, the magnetic teeth 139, the cylindrical magnetic yoke 13a, the non-magnetic member 181, and the cylindrical magnetic core 182, then flows through the armature coils. And flux amount crossing the armature coils is controlled by electric current supplied to the excitation coil 13e.

Principal part of the magnetic excitation part is composed by the housing 132 made of a magnetic material, the excitation coil 13e arranged at inner side of the housing 132, and the non-magnetic member 181 arranged to adjust magnetic resistance of excitation flux path, and is constituted so that the excitation coil 13e supplies induced flux between the cylindrical magnetic yoke 135 and the cylindrical magnetic yoke 13a.

In this embodiment, three flux paths exist in radial direction, and they are connected in parallel. The first flux path is constituted by the cylindrical magnetic yoke 135, the magnetic teeth 134, the island magnetic poles 141, the sub-field magnets 144, the island magnetic poles 142, the magnetic teeth 134, and the cylindrical magnetic yoke 13a. The second flux path is constituted by the cylindrical magnetic yoke 135, the magnetic teeth 134, the magnetic salient poles 143, the magnetic teeth 134, and the cylindrical magnetic yoke 13a. And the third flux path is constituted by the cylindrical magnetic yoke 135, the housing 132, the cylindrical magnetic core 182, the non-magnetic member 182, and the cylindrical magnetic yoke 13a. Although, almost flux coming from permanent magnets 145, 146, 147, 148 flows in small flux path represented as the flux 157 in FIG. 15, the flux 158 coming from the sub-field magnets 144 may flow through the third flux path. The magnetic resistance of the third flux path is arranged larger than that of the second flux path by arranging the non-magnetic member 182 between the cylindrical magnetic core 182 and the cylindrical magnetic yoke 13a, and setting area size and thickness thereof.

In this embodiment, in order to set magnetic resistance of the third flux path as size, the non-magnetic member 181 has been arranged, but it is also possible to arrange a permanent magnet instead of the non-magnetic member 181 with almost same thickness. In the case, permeability of the permanent magnet is same as air gap mostly, so setting of magnetic resistance of the third flux path can assume the same, and magnetic flux coming from the permanent magnet can assume additional fixed portion of flux flowing through the armature.

The resistance of the third flux path is set more greatly than the resistance of the second flux path by arranging the non-magnetic member 181 in the third flux path in this embodiment, and, of course, it is possible to remove the non-magnetic member 181 and to assume the resistance of the third flux path to be a smallness. In that case, the magnetic flux coming from the sub-field magnets 144 flows into the third flux path, and the amount of magnetic flux crossing through the armature coils 13b, 13b decreases. Although the relation between the amount of magnetic flux crossing through armature coils 13b, 13b and the current supplied to the excitation coil 13e changes a little, but it is unchanged that the excitation coil 13e can control the amount of magnetic flux crossing through armature coils 13b, 13b by an electric current supplied.

Figure 19:
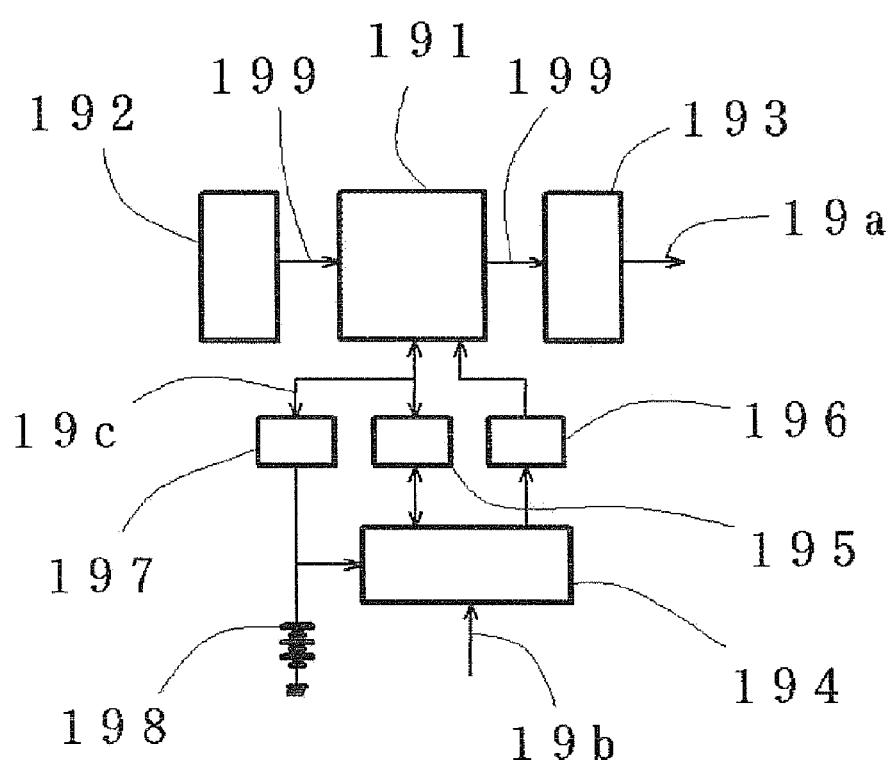
FIG. 19 is a block diagram of a rotating electric machine system according to the sixth embodiment of the present invention.

A rotating electric machine system according to a sixth embodiment of the present invention will be explained by using FIG. 19. The sixth embodiment is a rotating electric machine system that used the rotating electric machine apparatus of the first embodiment as a dynamo and an electric motor of a hybrid car.

In the figure, a number 191 shows the rotating electric machine apparatus shown in the first embodiment, and a rotary shaft 199 of the rotating electric machine apparatus 191 is combined so that torque may be transferred from engine 192 of the hybrid car by a belt, and torque of the rotary shaft 199 is transferred to a drive shaft 19a through a transmission 193. A control device 194 receives an instruction 19b from a higher rank control device, drives the rotating electric machine apparatus 191 as an electric motor through a drive circuit 195, and controls magnetic field strength in the rotating electric machine 191 through a field control circuit 196. Furthermore, the control device 194 receives the instruction 19b from the higher rank control device, rectifies electric power which appears in an output line 19c of the armature coils 16, 26 through a rectifier circuits 197, and charges a battery 198.

When magnet torque needs to be strengthened in low rotating speed region, an excitation current to increase magnetic pole area of the first magnetization is supplied to the excitation coil 1c from the magnetization control circuitry 5a, and magnetic pole area of the second magnetization is decreased as well as magnetic pole area of the first magnetization is increased, and flux amount flowing through the armature is made larger. When magnet torque needs to be weakened in high rotating speed region, the excitation current to increase magnetic pole area of the second magnetization is supplied to the excitation coil 1c from the magnetization control circuitry 5a, and magnetic pole area of the first magnetization is decreased as well as magnetic pole area of the second magnetization is increased, and flux amount flowing through the armature is made smaller.

When the hybrid car can be driven only on the torque of the engine 192, generated electric power which appears in the output line 19c of the armature coils 16, 26 is changed into DC current through the rectifier circuits 197, and makes the battery 198 charge by the instruction 19b. In that case, when power generation voltage becomes larger than optimal voltage that charges the battery 198 and flux amount flowing through the armature is made to be smaller, the flux adjustment current being supplied to the excitation coil 1c from the flux adjustment circuitry 59 is decreased. When the flux adjustment current is smaller than a predetermined value in the case, an excitation current to increase magnetic pole area of the second magnetization is supplied to the excitation coil 1c from the magnetization control circuitry 5a, and magnetic pole area of the first magnetization is decreased as well as magnetic pole area of the second magnetization is increased, and flux amount flowing through the armature is made smaller.

When power generation voltage becomes smaller than optimal voltage that charges the battery 198 and flux amount flowing through the armature is made to be larger, the flux adjustment current being supplied to the excitation coil 1c from the flux adjustment circuitry 59 is increased. When the flux adjustment current is larger than a predetermined value in the case, an excitation current to increase magnetic pole area of the first magnetization is supplied to the excitation coil 1c from the magnetization control circuitry 5a, and magnetic pole area of the first magnetization is increased as well as magnetic pole area of the second magnetization is decreased, and flux amount flowing through the armature is made larger.

Since the rotating electric machine apparatus is used as a constant voltage dynamo, when charging the battery 198, the converter that changes power generation voltage is unnecessary. Furthermore, the expensive converter can be made unnecessary by controlling on the optimal power generation voltage for each battery, even when a battery 198 includes two or more sorts of batteries with different in its voltage. Moreover, when charging the battery 198, the proportioning control of driving load and power generation load is also possible with the amount control of magnetic flux and the control of charging current.

This embodiment functions effectively also as an energy recovery system at the time of braking of the hybrid car. When directions of regenerative braking are received through the instruction 19b, the control device 194 makes the excitation current increase magnetic pole area of the first magnetization to be supplied to the excitation coil 1c from the magnetization control circuitry 5a, and makes magnetic pole area of the first magnetization increase, and makes flux amount flowing through the armature larger, and makes the battery 198 charge.

The electric power that can be taken out is large because flux amount through the armature coil 16, 26 is increased, and is temporarily stored in storage systems with electric double layer capacitor, etc., and energy recovery becomes large as well as braking force is secured. Since the rotating electric machine apparatus 191 is the physique employed as the electric motor for drive, so enough braking force can be generated as a generator for regenerative braking.

Although this embodiment employs the rotating electric machine system as a generator and a motor of the hybrid car, it is also possible to consider as the rotating electric machine system in an electric vehicle. In that case, the engine 192 of the hybrid car is removed in the above-mentioned embodiment, and energy recovery system in the braking time and driving system are composed only by the rotating electric machine system of this invention.

As described above, the rotating electric machine system of the present invention has been explained with reference to the embodiments. These embodiments are mere examples for realizing the theme or the purpose of the present invention and do not limit the scope of the invention. For example, although the armature coils were explained as three-phase circuit composition in the above-mentioned explanation, naturally the composition of single phase or multi-phase course is also possible, especially in the case of single phase, all the armature coils always contribute to driving force generating, and output density will be improved. Further, a rotating electric machine which changes combination, such as composition of a rotor magnetic pole, composition of an armature, and composition of a magnetic excitation part in the above-mentioned embodiment, and realizes the meaning of this invention can be constituted.

The rotating electric machine system according to the present embodiment of the present invention can be utilized as a high-power electric motor similarly to a conventional rotating electric machine, and additionally, enlarges the range of the practicable rotational speed, and furthermore, improves the function of the power generation, and also can control the power-generation function. By applying the present embodiment of the present invention as an electric generator and electric motor system for automobile application, the rotational speed range is able to be larger than the conventional one, and additionally, energy recovery in braking is enabled to improve the comprehensive energy consumption. The present embodiment of the present invention can realize the system that reduce the current flowing through armature coils, and control output power by the magnetic excitation part exclusively, and this embodiment of the present invention becomes capable of lowering voltage of power supply and cost reduction in drive circuit, etc. in that case. Furthermore, as the constant-voltage electric generator system, the power-generation voltage can be controlled to be constant in the wider rotational speed range, and therefore, the constant-voltage control circuit is not required, and furthermore, it becomes possible that a converter is not required for various types of battery charges in which voltages are different, and the entire system cost can be reduced.

It should be noted that the exemplary embodiments depicted and described herein set forth the preferred embodiments of the present invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

What is claimed is:

1. A rotating electric machine system having a rotor and an armature facing radially each other, the rotating electric machine system comprising:
    the rotor having island-shaped magnetic poles and magnetic salient poles alternately disposed in a circumferential direction on its plane facing the armature;
    the armature having armature coils disposed in a circumferential direction on its plane facing the rotor, and
    a magnetic excitation part for magnetizing the island-shaped magnetic poles and the magnetic salient poles collectively in the same direction;
    wherein the rotor has an isolation member including a permanent magnet and/or a non-magnetic member at least within the island-shaped magnetic poles to prevent passage of magnetic flux coming from outside, thickness of the isolation member within the island-shaped magnetic pole is larger than a thickness of the isolation member within the magnetic salient pole so that magnetic flux coming from the magnetic excitation part should be hard to flow through the island-shaped magnetic pole;
    the island-shaped magnetic poles are configured so as to be magnetized in about a same axial direction by at least one of a permanent magnet adjacent to the island-shaped magnetic pole and a permanent magnet within the island-shaped magnetic pole;
    the armature coils are grouped into a first armature magnetic pole group and a second armature magnetic pole group, and in an armature coil pair of the same phase in the first armature magnetic pole group and the second armature magnetic pole group which armature coils are supplied with driving current simultaneously, the armature coils of the armature coil pair are arranged such that the armature coil of one of the armature coil pair opposes the island-shaped magnetic pole when the armature coil of the other one of the armature coil pair opposes the magnetic salient pole, and the armature coils of the armature coil pair are connected to generate magnetic fluxes of mutually opposite directions when current flows;
    the magnetic excitation part has either one of an excitation coil and a field magnet at least;
    both ends of the magnetic excitation part are magnetically coupled respectively with one of the rotor and the armature arranged at an outermost circumference and one of the rotor and the armature arranged at an innermost circumference so that a magnetic flux from one end of the magnetic excitation part may return to the other end thereof through the armature and the magnetic salient poles; and
    an amount of magnetic flux flowing through the armature is controlled by changing an amount of magnetic flux supplied from the magnetic excitation part in accordance with an output of the rotating electric machine system so that the output is optimized.

2. The rotating electric machine system according to claim 1,
    wherein the rotor faces the armature through a single air gap;
    the armature has the armature coils at a magnetic yoke in circumferential direction facing the rotor;
    the rotor has the island-shaped magnetic poles and the magnetic salient poles alternately at a cylindrical magnetic substrate in a circumferential direction facing the armature;
    both ends of the magnetic excitation part are magnetically coupled respectively with the cylindrical magnetic substrate of the rotor and the magnetic yoke so that a magnetic flux coming from one end of the magnetic excitation part flows through the cylindrical magnetic substrate and the magnetic salient poles, the magnetic yoke, and returns to other end of the magnetic excitation part.

3. The rotating electric machine system according to claim 1,
    wherein a first armature and a rotor and a second armature are disposed radially to make a line in the order as recited here;
    the rotor has the island-shaped magnetic poles and the magnetic salient poles alternately in a circumferential direction facing the first armature and the second armature;
    each of the first armature and the second armature has the armature coils at a magnetic yoke in a circumferential direction facing the rotor;
    both ends of the magnetic excitation part are magnetically coupled respectively with the magnetic yoke of two armatures so that a magnetic flux coming from one end of the magnetic excitation part flows through the magnetic yoke of the first armature, the magnetic salient poles, the magnetic yoke of the second armature, and returns to other end of the magnetic excitation part.

4. The rotating electric machine system according to claim 1,
    wherein the island-shaped magnetic poles and the magnetic salient poles are constituted so that the cylindrical magnetic substrate is sectioned into circumferential direction by one of a permanent magnet and a magnet assembly having magnetization in a circumferential direction, and are magnetized in different polarity each other.

5. The rotating electric machine system according to claim 1,
wherein the magnet assembly which, consisting of permanent magnets placed on two sides of a magnetic substance, is disposed between the island-shaped magnetic pole and the magnetic salient pole;
the magnet assembly has a non-magnetic member so that magnetic flux coming from the magnetic excitation part should be hard to flow through the magnet assembly.

6. The rotating electric machine system according to claim 1,
wherein a first armature having the first armature magnetic pole group faces the rotor, and a second armature having the second armature magnetic pole group faces the rotor;
in an armature coil pair of the same phase in the first armature and the second armature, the armature coils of the armature coil pair are arranged such that the armature coil of one of the armature coil pair opposes the island-shaped magnetic pole when the armature coil of other one of the armature coil pair opposes the magnetic salient pole, and the armature coils of the armature coil pair are connected in series to generate magnetic flux of mutually opposite direction when current flows.

7. The rotating electric machine system according to claim 1,
wherein the armature has the first armature magnetic pole group and the second armature magnetic pole group in a different circumferential position;
in an armature coil pair of the same phase in the first armature magnetic pole group and the second armature magnetic pole group, the armature coils of the armature coil pair are arranged such that the armature coil of one of the armature coil pair opposes the island-shaped magnetic pole when the armature coil of other one of the armature coil pair opposes the magnetic salient pole, and the armature coils of the armature coil pair are connected in series to generate magnetic flux of mutually opposite direction when current flows.

8. The rotating electric machine system according to claim 1,
wherein the magnetic excitation part has a field magnet and an exciting coil to change magnetization of the field magnet;
the magnetic excitation part is constituted so that a magnetic flux coming from one of N pole and S pole of the field magnet returns to other pole of the field magnet through the armature and the magnetic salient poles of the rotor;
an excitation current is supplied to the excitation coil, and a magnetization state of the field magnet is changed irreversibly, and an amount of the magnetic flux flowing through the armature is controlled according to an output of the rotating electric machine system so that the output is optimized.

9. The rotating electric machine system according to claim 8,
wherein the field magnet has magnet elements having a different product of length and coercivity from each other disposed between a magnetic member;
the magnet elements are connected in parallel by the magnetic member;
the magnet element has one of a first magnetization and a second magnetization that are provided at opposite directions from each other;
the magnet element having the first magnetization magnetizes the magnetic salient pole in opposite direction to the magnetization direction in the island-shaped magnetic pole.

10. The rotating electric machine system according to claim 8,
wherein a main magnetic flux path and an excitation magnetic flux path are connected to the field magnet in parallel;
the main magnetic flux path is a path in which a magnetic flux flowing from one of N pole and S pole of the field magnet returns to other pole of the field magnet through the magnetic salient poles and the armature, and the excitation magnetic flux path is a path in which a magnetic flux flowing from one pole of the field magnet returns to other pole of the field magnet mainly in the magnetic excitation part;
the excitation coil is disposed to generate a magnetic flux in a path including the excitation magnetic flux path and the field magnet.

11. The rotating electric machine system according to claim 8,
wherein the field magnet has a first magnet element and a second magnet element with mutually different coercivity and a magnetic member;
the first magnet element and the second magnet element are connected in parallel by the magnetic member;
the excitation coil is disposed to cause a magnetic flux in closed magnetic flux path composed of the first magnet element and the second magnet element and the magnetic member.

12. The rotating electric machine system according to claim 8,
wherein a flux adjustment current of a degree which does not make the field magnet cause an irreversible magnetization change is supplied to the excitation coil in each magnetization state of the field magnet;
an induced flux by the flux adjustment current is superimposed on a flux coming from the field magnet so that magnetic flux amount flowing through the armature is adjusted.

13. The rotating electric machine system according to claim 8,
wherein a permanent magnet is disposed as the isolation member to prevent passage of magnetic flux coming from the magnetic excitation part within the island-shaped magnetic pole;
an excitation current is supplied to an armature coil facing the island-shaped magnetic pole so that a magnetization of the permanent magnet is changed.

14. The rotating electric machine system according to claim 8, further comprising a control device;
wherein a rotational force is an input;
the control device supplies the excitation current to the excitation coil so that a magnetic pole area of the first magnetization is decreased when a power generation voltage induced in the armature coils is larger than a predetermined value and an amount of a magnetic flux flowing through the armature is to be reduced, and supplies the excitation current to the excitation coil so that a magnetic pole area of the first magnetization is increased when the power generation voltage induced in the armature coils is smaller than the predetermined value and an amount of a magnetic flux flowing through the armature is to be increased; and
the power generation voltage is controlled to be the predetermined value.

15. The rotating electric machine system according to claim 8, further comprising a control device;
  wherein a current supplied to the armature coils is an input, and
  the control device supplies the excitation current to the excitation coil so that a magnetic pole area of the first magnetization is decreased when a rotational speed is larger than a predetermined value and an amount of a magnetic flux flowing through the armature is to be reduced, and supplies the excitation current to the excitation coil so that a magnetic pole area of the first magnetization is increased when the rotational speed is smaller than the predetermined value and an amount of a magnetic flux flowing through the armature is to be increased; and
  thereby a rotational force is optimally controlled.

16. The rotating electric machine system according to claim 8, further comprising a control device;
  wherein a current supplied to the armature coils is an input, a rotational force is an output,
  when a rotational speed is to be reduced, the control device connects a battery with the armature coils and supplies the excitation current to the excitation coil so that a magnetic pole area of the first magnetization is increased, and an amount of a magnetic flux flowing through the armature is increased; and
  a rotational energy is taken out as a power generation output.

17. The rotating electric machine system according to claim 1,
  wherein the magnetic excitation part has an excitation coil and an excitation flux path member;
  both ends of the excitation flux path member are magnetically coupled respectively with one of the rotor and the armature arranged at an outermost circumference and one of the rotor and the armature arranged at an innermost circumference;
  the excitation coil is constituted so as to induce a magnetic flux in a magnetic flux path including the excitation flux path member and the magnetic salient poles of the rotor and the armature; and
  an excitation current is supplied to the excitation coil, and a magnetic flux amount flowing through the armature is controlled according to an output of the rotating electric machine system so that the output is optimized.

18. The rotating electric machine system according to claim 17,
  wherein the magnetic excitation part has a magnetic gap in a magnetic flux path including the excitation flux path member so that magnetic flux from a permanent magnet in the island-shaped magnetic pole should not be short-circuited through the excitation flux path member.

19. A method for controlling a magnetic flux amount flowing through an armature of a rotating electric machine including a rotor and an armature facing radially each other, the rotor having island-shaped magnetic poles and magnetic salient poles separated by at least one of a magnetic gap and a permanent magnet in a circumferential direction on its plane facing the armature, the armature having armature coils disposed in a circumferential direction on its plane facing the rotor, and a magnetic excitation part for magnetizing the island-shaped magnetic poles and the magnetic salient poles collectively in same direction, said method comprising:
  arranging an isolation member including a permanent magnet and/or a non-magnetic member at least within the island-shaped magnetic poles to prevent passage of magnetic flux coming from outside, thickness of the isolation member within the island-shaped magnetic pole is larger than thickness of the isolation member within the magnetic salient pole so that magnetic flux coming from the magnetic excitation part should be hard to flow through the island-shaped magnetic pole;
  constituting the island-shaped magnetic poles so as to be magnetized in almost same radial direction by at least one of a permanent magnet adjacent to the island-shaped magnetic pole and a permanent magnet within the island-shaped magnetic pole;
  arranging a field magnet and an excitation coil to change magnetization of the field magnet in the magnetic excitation part;
  coupling magnetically both ends of the magnetic excitation part respectively with one of the rotor and the armature arranged at an outermost circumference and one of the rotor and the armature arranged at an innermost circumference so that magnetic flux from one of N pole and S pole of the field magnet returns to other pole of the field magnet through the magnetic salient poles and the armature; and
  supplying an excitation current to the excitation coil, and changing the field magnet magnetization irreversibly to control an amount of magnetic flux flowing through the armature.

20. A method for controlling a magnetic flux amount flowing through an armature of a rotating electric machine including a rotor and an armature facing radially each other, the rotor having island-shaped magnetic poles and magnetic salient poles separated by at least one of a magnetic gap and a permanent magnet in a circumferential direction on its plane facing the armature, the armature having armature coils disposed in a circumferential direction on its plane facing the rotor, and a magnetic excitation part for magnetizing the island-shaped magnetic poles and the magnetic salient poles collectively in same direction, said method comprising:
  arranging an isolation member including a permanent magnet and/or a non-magnetic member at least within the island-shaped magnetic poles to prevent passage of magnetic flux coming from outside, thickness of the isolation member within the island-shaped magnetic pole is larger than thickness of the isolation member within the magnetic salient pole so that magnetic flux coming from the magnetic excitation part should be hard to flow through the island-shaped magnetic pole;
  constituting the island-shaped magnetic poles so as to be magnetized in almost same radial direction by at least one of a permanent magnet adjacent to the island-shaped magnetic pole and a permanent magnet within the island-shaped magnetic pole;
  arranging an excitation coil and an excitation flux path member in the magnetic excitation part;
  coupling magnetically both ends of the excitation flux path member respectively with one of the rotor and the armature arranged at an outermost circumference and one of the rotor and the armature arranged at an innermost circumference so as to induce a magnetic flux in a magnetic flux path including the magnetic salient poles and the armature and the excitation flux path member; and
  supplying an excitation current to the excitation coil to control an amount of magnetic flux flowing through the armature.

* * * * *